(12) United States Patent
Kumagae et al.

(10) Patent No.: US 11,121,401 B2
(45) Date of Patent: Sep. 14, 2021

(54) NEGATIVE ELECTRODE FOR MAGNESIUM SECONDARY BATTERIES AND METHOD FOR PRODUCING SAME, AND MAGNESIUM SECONDARY BATTERY

(71) Applicant: MURATA MANUFACTURING CO., LTD., Kyoto (JP)

(72) Inventors: Kiyoshi Kumagae, Kyoto (JP); Yuri Nakayama, Kyoto (JP); Tadahiko Kubota, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 108 days.

(21) Appl. No.: 16/168,341

(22) Filed: Oct. 23, 2018

(65) Prior Publication Data

US 2019/0058209 A1   Feb. 21, 2019

Related U.S. Application Data

(63) Continuation of application No. PCT/JP2017/004046, filed on Feb. 3, 2017.

(30) Foreign Application Priority Data

Apr. 26, 2016  (JP) .............................. JP2016-088426

(51) Int. Cl.
*H01M 10/054*   (2010.01)
*H01M 4/134*   (2010.01)
(Continued)

(52) U.S. Cl.
CPC ......... *H01M 10/054* (2013.01); *H01M 4/134* (2013.01); *H01M 4/1395* (2013.01);
(Continued)

(58) Field of Classification Search
CPC .... H01M 10/054; H01M 4/46; H01M 4/1395; H01M 4/466; H01M 4/134; H01M 2004/027; H01M 4/66
See application file for complete search history.

(56) References Cited

U.S. PATENT DOCUMENTS 6,051,340 A     4/2000  Kawakami et al.
2012/0021292 A1* 1/2012  Awano ................. H01M 4/131
                                                     429/231.1
(Continued)

FOREIGN PATENT DOCUMENTS

CN      102714298    10/2012
EP      2 472 647    7/2012
(Continued)

OTHER PUBLICATIONS

Extended European Search Report dated Dec. 6, 2019 for corresponding European Application No. 17788989.6.
(Continued)

*Primary Examiner* — Stewart A Fraser
(74) *Attorney, Agent, or Firm* — K&L Gates LLP

(57) ABSTRACT

A method for producing a negative electrode for magnesium secondary batteries includes: providing a current collector having an underlying layer including a metal having a higher ionization tendency than magnesium, where the underlying layer is formed on a surface of the current collector; and forming a negative electrode active material layer including a magnesium layer on the current collector by a chemical plating method using the underlying layer as a base material.

7 Claims, 10 Drawing Sheets

(51) Int. Cl.
  *H01M 4/66*   (2006.01)
  *H01M 4/46*   (2006.01)
  *H01M 4/1395* (2010.01)
  *H01M 10/052* (2010.01)
  *H01M 12/08*  (2006.01)
  *H01M 4/02*   (2006.01)

(52) U.S. Cl.
  CPC ............ *H01M 4/46* (2013.01); *H01M 4/66* (2013.01); *H01M 10/052* (2013.01); *H01M 12/08* (2013.01); *H01M 2004/027* (2013.01); *H01M 2004/028* (2013.01); *Y02E 60/10* (2013.01)

(56) References Cited

U.S. PATENT DOCUMENTS

| | | |
|---|---|---|
| 2013/0196236 A1 | 8/2013 | Jung et al. |
| 2017/0149049 A1* | 5/2017 | Endoh ............... H01M 10/0525 |

FOREIGN PATENT DOCUMENTS

| | | |
|---|---|---|
| JP | H0850922 A | 2/1996 |
| JP | 2011249175 A | 12/2011 |
| JP | 201215057 A | 1/2012 |
| JP | 2012531725 A | 12/2012 |
| JP | 2013191481 A | 9/2013 |
| JP | 2014-143170 A | 8/2014 |
| JP | 2014179336 A | 9/2014 |
| JP | 2014186940 A | 10/2014 |
| KR | 10-2014-0138476 | 12/2014 |
| WO | 2016125217 A1 | 11/2016 |

OTHER PUBLICATIONS

Japanese Office Action dated Oct. 1, 2019, for corresponding Japanese Patent Application No. 2018-514122, 3 Pages.
International Search Report for Application No. PCT/JP2017/004046, dated Mar. 28, 2017.
Chinese Office Action dated Nov. 23, 2020 in corresponding Chinese Application No. 2017800255712.

* cited by examiner

NEGATIVE ELECTRODE FOR MAGNESIUM SECONDARY BATTERIES AND METHOD FOR PRODUCING SAME, AND MAGNESIUM SECONDARY BATTERY

CROSS REFERENCE TO RELATED APPLICATIONS

The present application is a continuation of PCT patent application no. PCT/JP2017/004046, filed on Feb. 3, 2017, which claims priority to Japanese patent application no. JP2016-088426 filed on Apr. 26, 2016, the entire contents of which are being incorporated herein by reference.

BACKGROUND

The present disclosure generally relates to a negative electrode for magnesium secondary batteries for magnesium secondary batteries; a method for producing the negative electrode; and a magnesium secondary battery.

Magnesium that has been used in magnesium secondary batteries is an abundant resource and is therefore more inexpensive compared with lithium, can generate a large quantity of electricity per unit volume by an oxidation-reduction reaction, and is highly safe when used in secondary batteries. For these reasons, a magnesium secondary battery has been focused as a second-generation secondary battery that can become an alternative to a lithium ion secondary battery. In a magnesium secondary battery, a negative electrode is usually composed of a metal magnesium thin plate. For the production of a metal magnesium thin plate, a high-temperature rolling treatment is required and therefore there is such a disadvantage that the cost of the production is expensive.

SUMMARY

The present disclosure generally relates to a negative electrode for magnesium secondary batteries for magnesium secondary batteries; a method for producing the negative electrode; and a magnesium secondary battery.

In the conventional method, a long time is required for the formation of a magnesium-plated layer by an electroplating method, and there is such a problem that it is difficult to reduce the cost for the production of an electrode for magnesium secondary batteries.

Therefore, one of the object of the present disclosure is to provide: a negative electrode for magnesium secondary batteries, in which a magnesium layer can be formed by a simpler and more inexpensive method; a method for producing the negative electrode for magnesium secondary batteries; and a magnesium secondary battery provided with the negative electrode for magnesium secondary batteries.

According to an embodiment of the present technology, a method for producing a negative electrode for magnesium secondary batteries is provided. The method includes:

providing a current collector having an underlying layer including a metal having a higher ionization tendency than magnesium, wherein the underlying layer is formed on a surface of the current collector; and forming a negative electrode active material layer including a magnesium layer on the current collector by a chemical plating method using the underlying layer as a base material.

According to another embodiment of the present technology, a method for producing a negative electrode for magnesium secondary batteries is provided. The method includes:

providing a current collector having a $1^{st}$ underlying layer including a metal having a higher ionization tendency than magnesium, wherein the $1^{st}$ underlying layer is formed on a surface of the current collector;

forming a $1^{st}$ magnesium layer on the current collector by a chemical plating method using the $1^{st}$ underlying layer as a base material, and subsequently repeating a process from n=1 to n=N-1 to form a negative electrode active material layer including magnesium layers laminated on each other on the current collector, the process including:

forming a $(n+1)^{th}$ underlying layer including the metal having a higher ionization tendency than magnesium on a $n^{th}$ (wherein n=1, 2, ..., N-1; and N represents an integer of 2 or greater) magnesium layer; and forming a $(n+1)^{th}$ magnesium layer on the $n^{th}$ magnesium layer by the chemical plating method using the $(n+1)^{th}$ underlying layer as a base material.

According to another embodiment of the present technology, the negative electrode for magnesium secondary batteries is provided. The negative electrode comprising a current collector and a negative electrode active material layer that is provided on the surface of the current collector and includes magnesium, wherein a value of a BET specific surface area of the negative electrode active material layer is 1 $m^2$ or more, preferably 10 $m^2$ or more, per 1 gram of the negative electrode active material layer.

According to another embodiment of the present technology, a magnesium secondary battery is provided. The magnesium secondary battery includes a negative electrode for magnesium secondary batteries, the negative electrode for magnesium secondary batteries being provided with a current collector and a negative electrode active material layer that is provided on the surface of the current collector and includes magnesium, and wherein a value of a BET specific surface area of the negative electrode active material layer is 1 $m^2$ or more, preferably 10 $m^2$ or more, per 1 gram of the negative electrode active material layer.

In each of the methods for producing a negative electrode for magnesium secondary batteries according to the embodiments of the present disclosure, a magnesium layer is formed on a current collector by a chemical plating method. Therefore, the magnesium layer can be formed by a simpler and more inexpensive method. In the negative electrode for magnesium secondary batteries of the present disclosure or the magnesium secondary battery of the present disclosure, the value of the BET specific surface area of the negative electrode active material layer is specified.

Furthermore, in the negative electrode for magnesium secondary batteries which is produced by the methods for producing a negative electrode for magnesium secondary batteries according to the embodiments of the present disclosure, the reaction interface between the negative electrode active material and the electrolytic solution is increased, the overvoltage of the secondary battery during discharge is largely reduced, and the load during a charge-discharge reaction is reduced, and side reactions or the like are also reduced. As a result, it is believed that the cycle properties can be improved. The advantageous effects described in the description are merely illustrative, and other suitable properties relating to the present technology may be realized and as further described.

DETAILED DESCRIPTION

Figure 1A:
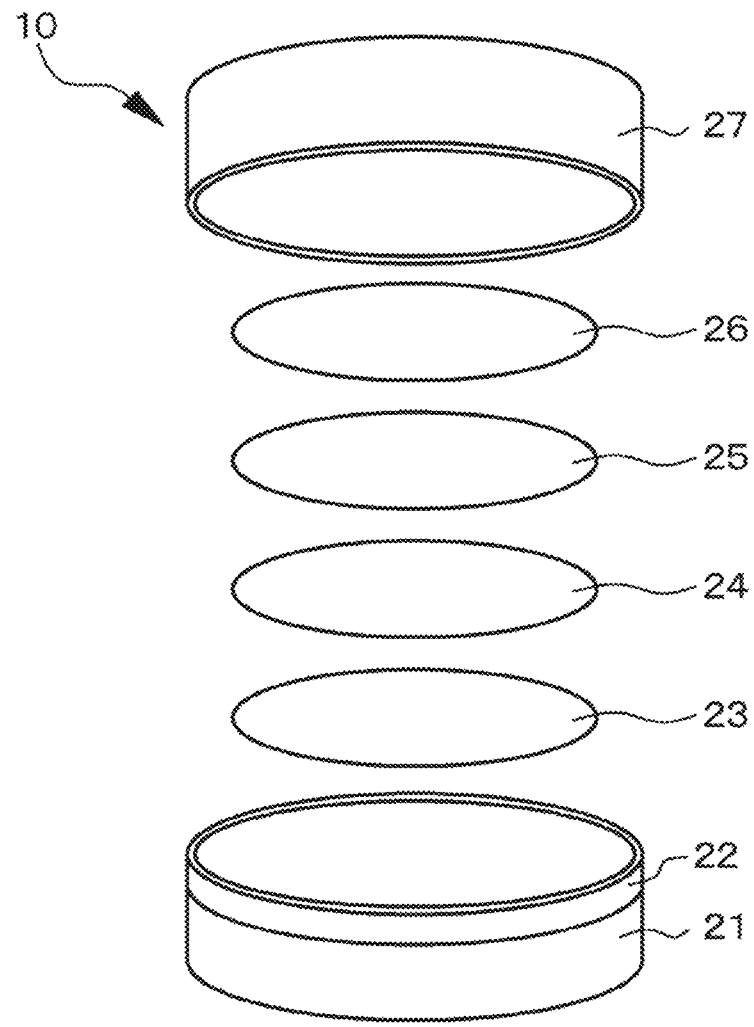
FIG. 1A is a schematic breakdown illustration of a magnesium secondary battery of Example 1.

The present disclosure generally relates to a negative electrode for magnesium secondary batteries for magnesium secondary batteries; a method for producing the negative electrode; and a magnesium secondary battery. As described herein, the present disclosure will be described based on examples with reference to the drawings, but the present disclosure is not to be considered limited to the examples, and various numerical values and materials in the examples are considered by way of example.

The chemical plating method to be employed in the methods for producing a negative electrode for magnesium secondary batteries according to embodiments of the present disclosure is called "a replacement method" and is also called "an immersion plating method".

In the method for producing the negative electrode for magnesium secondary batteries according to an embodiment of the present disclosure, an embodiment can be mentioned in which a $(n+1)^{th}$ underlying layer is formed by an electroplating method or an electrolytic deposition method. In the methods for producing a negative electrode for magnesium secondary batteries according to the embodiments of the present disclosure including the above-mentioned preferred embodiment, an embodiment can be mentioned in which the metal is at least one metal selected from the group consisting of lithium (Li), potassium (K), calcium (Ca) and sodium (Na), more preferably lithium (Li).

Furthermore, in the methods for producing a negative electrode for magnesium secondary batteries according to the embodiments of the present disclosure including the above-mentioned preferred embodiments, an embodiment can be mentioned in which the value of the BET specific surface area of the negative electrode active material layer is 1 $m^2$ or more, preferably 10 $m^2$ or more, per 1 g of the negative electrode active material layer. The measurement of the BET specific surface area of the negative electrode active material layer can be carried out by a method involving allowing a gas molecule having a known adsorption occupation area to be adsorbed on the surface of the negative electrode active material layer and then determining the specific surface area of the negative electrode active material layer from the adsorption amount of the gas molecule.

In the methods for producing a negative electrode for magnesium secondary batteries according to the embodiments of the present disclosure including the above-mentioned preferred embodiments (wherein the methods are sometimes referred to as "the method of the present disclosure" comprehensively, hereinafter), as the method for forming underlying layers (which include a $1^{st}$ underlying layer, and are sometimes collectively referred to as "underlying layers", hereinafter), the following methods can be exemplified: a method in which the underlying layers are pressure-bonded onto the surface of the current collector; a method in which the underlying layers are formed on the surface of the current collector by an electroplating method; a method in which the underlying layers are formed by a chemical plating method; a method in which the underlying layers are formed by a combination of a chemical plating method and an electroplating method; and a method in which the underlying layers are formed by an electrolytic deposition method. The thicknesses of the underlying layers are essentially arbitrary, and is, for example, 20 to 50 μm.

In the method for producing the negative electrode for magnesium secondary batteries according to the second aspect of the present disclosure, the value of N is essentially arbitrary, and may be de determined depending on the finally required thickness of the magnesium layer. The thickness of the $(n+1)^{th}$ underlying layer may also be determined depending on finally required thickness of the magnesium layer.

Examples of the material constituting the current collector include: a foil-like material such as a metal foil (e.g., a copper foil, a nickel foil, a stainless steel foil) and an alloy foil (e.g., a metal sheet, an alloy foil); and a plate-like material. The negative electrode active material layer (magnesium layer) may be formed on one surface or both surfaces of the current collector. The formation of the negative electrode active material layer (magnesium layer) may be carried out in a batch-mode or may be carried out continuously (in a so-called "roll-to-roll mode").

The magnesium layer is formed by a chemical plating method (also referred to as an electroless plating method). An example of the component constituting the plating solution to be used for the formation of the magnesium layer is a magnesium salt. A specific example of the magnesium salt is $MgX_2$ (wherein X represents a halogen atom, desirably a chlorine (Cl) or bromine (Br) atom). Another specific example of the component is $R_2$—Mg, wherein examples of R include an alkyl group, a dialkylboron group, a diarylboron group, an alkylcarbonyl group (e.g., a methylcarbonyl group), a trialkylsilyl group (e.g., a trimethylsilyl group), and an alkylsulfonyl group (e.g., a trifluoromethylsulfonyl group). Another specific example of the component is R'—Mg—X, wherein examples of R' include a linear or branched alkyl group having 1 to 10 carbon atoms, an aryl group and an amino group, such as a methyl group, an ethyl group, a butyl group, a phenyl group, an aniline group, and X is as defined above. Another specific example of the component constituting the plating solution is $Mg(ClO_4)_2$. These components may be used singly, or a combination of two or more of them may be used. As the solvent, a sulfone-based solvent such as ethyl-n-propyl sulfone (EnPS) and an ether-based solvent such as triglyme and THF can be used. The solvent is not limited to these solvents, and any one can be used as long as the magnesium salt can be dissolved therein and magnesium can be precipitated (i.e., magnesium can be removed) therefrom.

In the case where an underlying layer composed of lithium (Li) is formed by an electroplating method, any electrolytic solution may be used as a plating solution, as long as Li used in the lithium ion secondary battery can be precipitated therefrom. Concretely, an example of the component constituting the plating solution is a mixed solvent of EC (ethylene carbonate) and DMC (dimethyl carbonate) (mixing ratio: 1:1 by volume) containing 1 mole/1 of $LiPF_6$.

An air battery and a fuel cell can be constituted using the magnesium layer produced by the methods for producing a negative electrode for magnesium secondary batteries according to the embodiments of the present disclosure as an electrode.

Hereinafter, the magnesium secondary battery of the present disclosure, the magnesium secondary battery produced by the methods for producing a negative electrode for magnesium secondary batteries according to the embodiments of the present disclosure and the magnesium secondary battery provided with the negative electrode for magnesium secondary batteries of the present disclosure are collectively referred to as "magnesium secondary batteries in the present disclosure".

In each of the magnesium secondary batteries in the present disclosure, a positive electrode in which sulfur (S), graphite fluoride $((CF)_n)$, an oxide, a halide, a sulfide, a selenide or the like of a metal [e.g., scandium (Sc.), titanium (Ti), vanadium (V), chromium (Cr), manganese (Mn), iron (Fe), cobalt (Co), nickel (Ni), copper (Cu), zinc (Zn), molybdenum (Mo)] is used as a positive electrode active material can be used. However, the positive electrode is not limited to the above-mentioned one, and may have such a structure that a positive electrode active material layer is formed on the surface of the positive electrode current collector. Alternatively, the positive electrode may have such a structure that the positive electrode has no positive electrode current collector and is composed of only a positive electrode active material layer. The positive electrode current collector is composed of, for example, a metal foil such as an aluminum foil. If necessary, the positive electrode active material layer may contain at last one component selected from conductive additives and binders.

Examples of the conductive additive include carbon materials such as graphite, carbon fibers, carbon black and carbon nanotubes. These components may be used singly, or two or more of them may be used in the form of a mixture. As the carton fibers, vapor growth carbon fibers (VGCFs) and the like can be used. As the carbon black, acethylene black, Ketjen black and the like can be used. As the carbon nanotubes, single-wall carbon nanotubes (SWCNTs) and multi-wall carbon nanotubes (MWCNTs) such as double-wall carbon nanotubes (DWCNTs) can be used. Alternatively, a material other than carbon materials may also be used, as long as the material has good electric conductivity. For example, a metallic material such as a Ni powder, a conductive polymeric material and the like can also be used. As the binder, a fluorine-containing resin (e.g., polyvinylidene fluoride (PVdF), polytetrafluoroethylene (PTFE)) and a polymeric resin (e.g., a polyvinyl alcohol (PVA)-based resin, a styrene-butadiene copolymer rubber (SBR)-based resin) can be used. As the binder, a conductive polymer may also be used. As the electrically conductive polymer, a substituted or unsubstituted polyaniline, polypyrrole and polythiophene, a (co)polymer composed of one or two components selected from these components or the like may be used.

The positive electrode and the negative electrode are separated from each other by an inorganic or organic separator through which magnesium ions can pass, while preventing the occurrence of short circuit due to the contact therebetween. The separator is composed of, for example, a porous membrane made from a synthetic resin such as a polyolefin-based resin (e.g., a polypropylene resin and a polyethylene resin), a polyimide resin, a polytetrafluoroethylene resin, a polyvinylidene fluoride resin, a polyphenylene sulfide resin and an aromatic polyamide; a porous membrane made from ceramic or the like; glass fibers; and a non-woven fabric made from liquid crystal polyester fibers, aromatic polyamide fibers and cellulose fibers, or a ceramic non-woven fabric. Among these materials, a porous film or membrane made from polypropylene or polyethylene is preferred, from the viewpoint that an excellent short circuit prevention effect can be achieved and the safety of the secondary battery can be improved due to a shut-down effect. Alternatively, the separator may be composed of a multilayer membrane composed of two or more porous membranes laminated on each other, or a separator having an inorganic layer applied thereon or a separator containing an inorganic material may also be used. The thickness of the separator is preferably 5 to 50 μm inclusive, more preferably 7 to 30 μm inclusive. If the separator is too thick, the amount of an active material filled may be decreased and therefore the battery capacitance may be decreased, and the ion conductivity may also be deteriorated and therefore current properties may be decreased. If the separator is too thin, on the other hand, the mechanical strength of the separator may be deteriorated.

The magnesium secondary battery in the present disclosure contains an electrolytic solution. The electrolytic solution contains a sulfone and a magnesium salt dissolved in the sulfone, wherein the magnesium salt may be a magnesium halide. An example of the magnesium halide is $MgX_2$ (X=Cl, Br, I), such as magnesium chloride ($MgCl_2$), magnesium bromide ($MgBr_2$) and magnesium iodide ($MgI_2$). Alternatively, the magnesium salt may be at least one compound selected from the group consisting of magnesium perchlorate ($Mg(ClO_4)_2$), magnesium tetrafluoroborate (Mg ($BF_4$)$_2$), magnesium hexafluorophosphate (Mg($PF_6$)$_2$), magnesium hexafluoroarsenate (Mg($AsF_6$)$_2$), a magnesium perfluoroalkyl sulfonate ((Mg($R_{f1}SO_3$)$_2$), wherein $R_{f1}$ represents a perfluoroalkyl group), magnesium tetraphenylborate (Mg(B($C_6H_5$)$_4$)$_2$), and a magnesium perfluoroalkylsulfonyl imidate (Mg(($R_{f2}SO_2$)$_2$N)$_2$, wherein $R_{f2}$ represents a perfluoroalkyl group). The above-mentioned magnesium salts including magnesium chloride to a magnesium perfluoroalkylsulfonyl imidate are conveniently referred to as "magnesium salt-A". In the magnesium salt-A, the molar ratio of the sulfone to the magnesium salt is, for example, preferably 4 to 35 inclusive, more preferably 6 to 16 inclusive, still more preferably 7 to 9 inclusive, but is not limited to these values.

Another example of the magnesium salt is magnesium borohydride (Mg($BH_4$)$_2$). When the magnesium salt used is magnesium borohydride (Mg($BH_4$)$_2$) and therefore contains no halogen atom, the need for the production of various members constituting the magnesium secondary battery from materials having high corrosion resistance can be eliminated. The electrolytic solution can be produced by dissolving magnesium borohydride in the sulfone. The magnesium salt composed of magnesium borohydride (Mg($BH_4$)$_2$) is conveniently referred to as "magnesium salt-B". The electrolytic solution of this type is a magnesium ion-containing non-aqueous electrolytic solution in which the magnesium salt-B is dissolved in a solvent composed of the sulfone. The molar ratio of the sulfone to the magnesium salt-B in the electrolytic solution is, for example, 50 to 150 inclusive, typically 60 to 120 inclusive, preferably 65 to 75 inclusive, but is not limited to these values.

The sulfone may be an alkylsulfone or an alkylsulfone derivative each represented by $R_1R_2SO_2$ (wherein $R_1$ and $R_2$ independently represent an alkyl group). The types of $R_1$ and $R_2$ (i.e., the number of carbon atoms, and the combination thereof) are not particularly limited, and can be selected as required. The number of carbon atoms in each of $R_1$ and $R_2$ is preferably 4 or less, but is not limited thereto. The sum total of the number of carbon atoms in $R_1$ and the number of carbon atoms in $R_2$ is preferably 4 to 7 inclusive, but is not limited thereto. Specific examples of each of $R_1$ and $R_2$ include a methyl group, an ethyl group, an n-propyl group, an i-propyl group, an n-butyl group, an i-butyl group, an s-butyl group and a t-butyl group.

An example of the alkylsulfone is at least one alkylsulfone selected from the group consisting of dimethyl sulfone (DMS), methyl ethyl sulfone (MES), methyl-n-propyl sulfone (MnPS), methyl-i-propyl sulfone (MiPS), methyl-n-butyl sulfone (MnBS), methyl-i-butyl sulfone (MiBS), methyl-s-butyl sulfone (MsBS), methyl-t-butyl sulfone (MtBS), ethyl methyl sulfone (EMS), diethyl sulfone (DES), ethyl-n-propyl sulfone (EnPS), ethyl-i-propyl sulfone (EiPS), ethyl-n-butyl sulfone (EnBS), ethyl-i-butyl sulfone (EiBS), ethyl-s-butyl sulfone (EsBS), ethyl-t-butyl sulfone (EtBS), di-n-propyl sulfone (DnPS), di-i-propyl sulfone (DiPS), n-propyl-n-butyl sulfone (nPnBS), n-butyl ethyl sulfone (nBES), i-butyl ethyl sulfone (iBES), s-butyl ethyl sulfone (sBES) and di-n-butyl sulfone (DnBS). An example of the alkylsulfone derivative is ethyl phenyl sulfone (EPhS). Among these sulfones, at least one sulfone selected from the group consisting of EnPS, EiPS, EsBS and DnPS is preferred.

In the electrolytic solution, an additive may be further contained as required. An example of the additive is a salt in which the metal ion is composed or a cation or at least one atom or atomic group selected from the group consisting of aluminum (Al), beryllium (Be), boron (B), gallium (Ga), indium (In), silicon (Si), tin (Sn), titanium (Ti), chromium (Cr), iron (Fe), cobalt (Co) and lanthanum (La). Another example of the additive is a salt containing at least one atom, organic group or anion selected from the group consisting of a hydrogen atom, an alkyl group, an alkenyl group, an aryl group, a benzyl group, an amide group, a fluoride ion ($F^-$), a chloride ion ($Cl^-$), a bromide ion ($Br^-$), a iodide ion ($I^-$), a perchlorate ion ($ClO_4^-$), a tetrafluoroborate ion ($BF_4^-$), a hexafluorophosphate ion ($PF_6^-$), a hexafluoro arsenate ion ($AsF_6^-$), a perfluoroalkylsulfonate ion ($R_{f1}SO_3^-$, wherein $R_{f1}$ represents a perfluoroalkyl group) and a perfluoroalkylsulfonylimide ion (($R_{f2}SO_2$)$_2$$N^-$, wherein $R_{f2}$ represents a perfluoroalkyl group). When the additive is added, the ion conductivity of the electrolytic solution can be improved.

The electrolytic solution containing the magnesium salt-A can be produced, for example, through the steps of:

dissolving the magnesium salt-A in a low-boiling-point solvent capable of dissolving the magnesium salt-A therein;

dissolving the sulfone in the solution prepared by dissolving the magnesium salt-A in the low-boiling-point solvent; and removing the low-boiling-point solvent from the solution having the sulfone dissolved therein.

As the low-boiling-point solvent capable of dissolving the magnesium salt-A therein, any solvent which can dissolve the magnesium salt-A therein and has a lower boiling point than that of the selected sulfone can be used basically. The low-boiling-point solvent can be selected as required, and an alcohol is preferably used. The alcohol may be a monohydric alcohol or a polyhydric alcohol, and may be a saturated alcohol or an unsaturated alcohol. Specific examples of the alcohol include, but are not limited to, methanol, ethanol, 1-propanol, 2-propanol (isopropanol), 1-butanol, 2-butanol (sec-butanol), 2-methyl-1-propanol (isobutanol), 2-methyl-2-propanol (tert-butanol) and 1-pentanol. As the alcohol, a dehydrated alcohol can be used preferably.

Concretely, firstly the magnesium salt-A is dissolved in the alcohol. As the magnesium salt-A, an anhydrous magnesium salt can be used preferably. In general, the magnesium salt-A cannot be dissolved in a sulfone. However, the magnesium salt-A can be dissolved in an alcohol well. When the magnesium salt-A is dissolved in the alcohol, magnesium is coordinated to the alcohol. Subsequently, the sulfone is dissolved in the alcohol having the magnesium salt-A dissolved therein. Subsequently, the solution is heated under a reduced pressure to remove the alcohol. During the removal of the alcohol, the alcohol coordinated to magnesium is replaced (or substituted) by the sulfone. In this manner, the electrolytic solution can be produced.

As mentioned above, a magnesium ion-containing non-aqueous electrolytic solution which can be used for metal magnesium and can exhibit an electrochemically reversible magnesium precipitation/dissolution reaction at room temperature can be produced using the sulfone that is a non-ether solvent.

Alternatively, the electrolytic solution contains a solvent composed of the sulfone and a non-polar solvent and the magnesium salt-A dissolved in the solvent.

The non-polar solvent can be selected as required, and is preferably a non-aqueous solvent having a dielectric constant of 20 or less and 20 or less donors. A specific example of the non-polar solvent is at least one non-polar solvent selected from the group consisting of an aromatic hydrocarbon, an ether, a ketone, an ester and a linear carbonate ester. Specific examples of the aromatic hydrocarbon include toluene, benzene, o-xylene, m-xylene, p-xylene and 1-methyl naphthalene. Specific examples of the ether include diethyl ether and tetrahydrofuran. A specific example of the ketone is 4-methyl-2-pentanone. Specific examples of the ester include methyl acetate and ethyl acetate. Specific examples of the linear carbonate ester include dimethyl carbonate, diethyl carbonate and ethyl methyl carbonate.

The sulfone and the magnesium salt-A are as mentioned above. If necessary, the above-mentioned additive may be added to the electrolytic solution. The molar ratio of the sulfone to the magnesium salt-A is, for example, preferably 4 to 20 inclusive, more preferably 6 to 16 inclusive, still more preferably 7 to 9 inclusive, and is not limited thereto.

The electrolytic solution containing the magnesium salt-A and the non-polar solvent can be produced, for example, through the following steps:

dissolving the magnesium salt-A in a low-boiling-point solvent capable of dissolving the magnesium salt-A therein;

dissolving the sulfone in a solution prepared by dissolving the magnesium salt-A in the low-boiling-point solvent;

removing the low-boiling-point solvent from a solution having the magnesium salt-A dissolved therein; and mixing the non-polar solvent with a solution from which the low-boiling-point solvent is removed.

Concretely, firstly the magnesium salt-A is dissolved in the alcohol. As a result, the alcohol is coordinated to magnesium. As the magnesium salt-A, an anhydrous magnesium salt can be used preferably. Subsequently, the sulfone is dissolved in the alcohol having the magnesium salt dissolved therein. Subsequently, the solution is heated under a reduced pressure to remove the alcohol. During the removal of the alcohol, the alcohol coordinating to magnesium is replaced (or substituted) by the sulfone. Subsequently, the non-polar solvent is mixed with a solution from which the alcohol is removed. In this manner, the electrolytic solution can be produced.

Another examples of the solvent include ethylene carbonate, propylene carbonate, dimethyl carbonate, diethyl carbonate, ethyl methyl carbonate, methyl propyl carbonate, acetonitrile, dimethoxyethane, diethoxyethane, vinylene carbonate and γ-butyrolactone. These solvents may be used singly, or two or more of them may be used in the form of a mixture.

Alternatively, a generally used ether-type solvent such as THF (tetrahydrofuran) may also be used.

The electrolyte layer may be composed of the electrolytic solution and a polymeric compound that is a carrier for carrying the electrolytic solution therein. The polymeric compound may be one that can be swollen with the electrolytic solution. In this case, the polymeric compound swollen with the electrolytic solution may have a gel-like form. Specific examples of the polymeric compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl, methacrylate, polyacrylic acid, polymethacrylic acid, a styrene-butadiene rubber, a nitrile-butadiene rubber, polystyrene and a polycarbonate. Particularly from the viewpoint of electrochemical stability, polyacrylonitrile, polyvinylidene fluoride, polyhexafluoropropylene of polyethylene oxide is preferred. The electrolyte layer may serve as a solid electrolyte layer.

Figure 11:
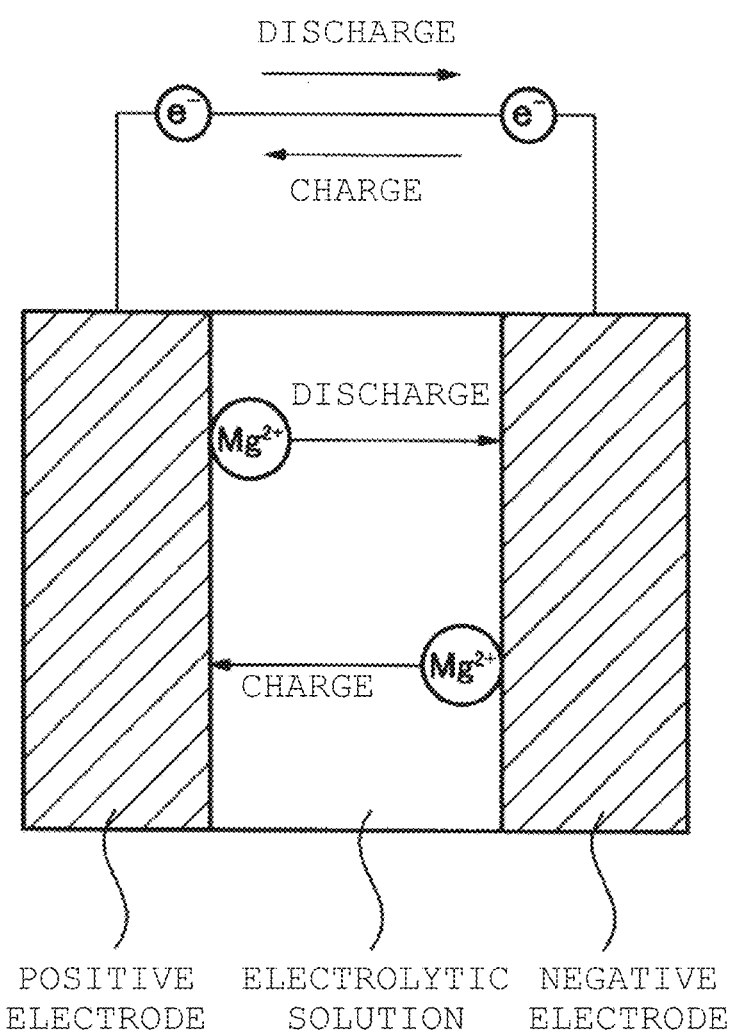
FIG. 11 is a conceptual view of a magnesium secondary battery in the present disclosure according to an embodiment of the present technology.

The conceptual view of a magnesium secondary battery (a magnesium ion secondary battery) having the above-described constitution is shown in FIG. 11, in which magnesium ions ($Mg^{2+}$) move from the positive electrode toward the negative electrode through the electrolytic solution during charging, whereby the electric energy is converted to a chemical energy and is stored. During discharging, magnesium ions return from the negative electrode to the positive electrode through the electrolytic solution, whereby an electric energy is generated.

In the magnesium secondary battery in the present disclosure, the electrode structure composed of the positive electrode, the separator and the negative electrode may have such a structure that the positive electrode, the separator, the negative electrode and the separator are wound, or may have such a structure that the positive electrode, the separator, the negative electrode and the separator are stacked on one another. A strip-like electrode structure or a wound electrode structure may be housed in a wound state in an electrode structure housing member, and a strip-like electrode structure may be housed in a stacked state in an electrode structure housing member. In these cases, the outer shape of the electrode structure housing member may be cylindrical or rectangular (flat-plate-like). Examples of the shape or form of the magnesium secondary battery include a coin-like shape, a button-like shape, disk-like shape, a flat-plate-like shape, a rectangular shape, a cylindrical shape and a laminate-type shape (a laminate film-type shape).

Examples of the material for the electrode structure housing member (battery can) that constitutes a cylindrical magnesium secondary battery include iron (Fe), nickel (Ni), aluminum (Al), titanium (Ti), alloys of these metals, and stainless steel (SUS). It is preferred that the battery can is plated with nickel or the like in order to prevent the electrochemical corrosion associated with the charge/discharge of the secondary battery. The exterior member in a laminate-type (laminate film-type) secondary battery preferably has a form having a multilayer structure composed of plastic material layers (fusion layers), metal layers and plastic material layers (surface-protecting layers), i.e., the form of a laminate film. In the case where it is intended to produce a laminate-film-type secondary battery, the exterior member is folded in such a manner that the fusion layers face each other with the electrode structure interposed therebetween and then the outer peripheral parts of the fusion layers are fused to each other, for example. The exterior member may be one produced by bonding two laminate films to each other with an adhesive agent or the like interposed therebetween. The fusion layer is composed or a film of an olefin resin such as polyethylene, polypropylene, modified polyethylene, modified polypropylene, a polymer thereof, or the like. The metal layer is composed of, for example, an aluminum foil, a stainless steel foil or a nickel foil. The surface-protecting layer is composed of, for example, nylon or polyethylene terephthalate. The exterior member is preferably an aluminum laminate film in which a polyethylene film, an aluminum foil and a nylon film are laminated in this order. The exterior member may be a laminate film having another multilayer structure, or a polymer film made from polypropylene or the like, or a metal film.

A positive electrode lead part can be attached to a positive electrode current collector by a spot-welding method or ultrasonic welding. The positive electrode lead part is desirably a net-like metal foil. However, the positive electrode lead part may not be a metal, as long as the positive electrode lead part is electrochemically and chemically stable and through which an electricity can run. An example of the material for the positive electrode lead part is aluminum (Al). A negative electrode current collector can be attached to a negative electrode lead art by spot-welding or ultrasonic welding. The negative electrode lead part is desirably a net-like metal foil. However, the negative electrode lead part may not be a metal, as long as the negative electrode lead part is electrochemically and chemically stable and through which an electricity can run. Examples of the material for the negative electrode lead part include copper (Cu) and nickel (Ni).

The magnesium secondary battery in the present disclosure can be used as a driving power supply or an auxiliary power supply for a mobile information terminal such as a note-type personal computer, various display devices, a PDA (personal digital assistant), a mobile telephone, a smart phone, a main phone or a codeless handset for a codeless telephone, a video movie (e.g., a video camera, a camcorder), a digital still camera, electronic paper such as an electronic book an electronic newspaper, an electronic dictionary, a music player, a portable music player, a radio, a portable radio, a headphone, a headphone stereo cassette player, a game machine, a navigation system, a memory card, a heart pacemaker, a hearing aid, an electric power tool, an electric shaver, a refrigerator, an air conditioner, a television receiver, a stereo, a water heater, a microwave oven, a dish washer, laundry machine, a dryer machine, lighting device including a room lamp, various electric devices (including portable electronic devices), a toy, a medical device, a robot, a road conditioner, traffic light, a railroad vehicle, a golf cart, an electric cart, an electric automobile (including a hybrid car) or the like. The magnesium secondary battery in the present disclosure can also be installed in, for example, a power supply for electric power storage use for an architectural structure including a house or a power-generating facility, or can be used for supplying an electric power to these facilities. A conversion device which receives the supply of an electric power and converts the electric power to a driving force in an electric automobile is generally a motor. An example of a control device for executing an information processing associated with the control of a vehicle is a control device that can perform the display of a remaining battery level on the basis of the information about the remaining battery level of the secondary battery.

The magnesium secondary battery can also be used in an electrical storage device in a so-called "smart grid". The electrical storage device can supply an electric power and can also store an electric power when receives the supply of an electric power from other power source. Examples of the "other power source" include thermal power generation, nuclear power generation, hydroelectric power generation, a solar cell, wind power generation, geothermal power generation and a fuel cell (including a biofuel cell).

The magnesium secondary battery in the present disclosure including the above-mentioned various preferred embodiments can be applied to a secondary battery to be used in a battery pack equipped with the secondary battery, a control means for performing the control associated with the secondary battery and an exterior member in which the secondary battery is to be housed. In the battery pack, the control means can perform, for example, the control of charging/discharging, over-discharging or over-charging associated with the secondary battery.

The magnesium secondary battery in the present disclosure including the above-mentioned various preferred embodiments can be applied to a secondary battery to be used in an electronic device that receives the supply of electric power from the secondary battery.

The magnesium secondary battery in the present disclosure including the above-mentioned various preferred embodiments can be applied to a secondary battery to be used in an electric vehicle equipped with a conversion device that receives the supply of an electric power from the secondary battery to convert the electric power to a diving force for the vehicle and a control device for executing an information processing associated with the control of the vehicle on the basis of information about the secondary battery. In the electric vehicle, the conversion device (converter) typically can receive the supply of an electric power from the secondary battery to drive a motor, thereby generating a driving force. For the driving of the motor, regenerative energy may also be utilized. The control device (controller) including a processor can also execute, for example, an information processing associated with the control of the vehicle on the basis of the remaining battery power of the secondary battery. Examples of the electric vehicle include an electric vehicle, an electric motorbike, an electric bicycle, a railroad vehicle and a so-called "hybrid car".

The magnesium secondary battery in the present disclosure including the above-mentioned various preferred embodiments can be applied to a secondary battery to be used in an electric power storage system (or an electric power supply system) that is so configured as to receive the supply of an electric power from the secondary battery and/or to supply an electric power from a power source to the secondary battery. The electric power storage system may be any one as long as the system can almost always utilize an electric power, and a simple electric power unit is included within the scope of the electric power storage system. Examples or the electric power storage system include a smart grid, a home energy management system (HEMS) and a vehicle, and the electric power storage system can perform electrical storage.

The magnesium secondary battery in the present disclosure including the above-mentioned various preferred embodiments can be applied to a secondary battery to be used in a power supply for electric power storage use which is equipped with the secondary battery and is so configured that an electronic device to which an electric power is to be supplied can be connected thereto. The use application of the power supply for electric power storage use is not particularly limited, and the power supply for electric power storage use can be basically used in any electric power systems or any electric power units. For example, the power supply for electric power storage use can be used in a smart grid.

Example 1 relates to a magnesium secondary battery and a negative electrode for magnesium secondary batteries of the present disclosure, and a method for producing the negative electrode for magnesium secondary batteries according to an embodiment the present disclosure.

Figure 1B:
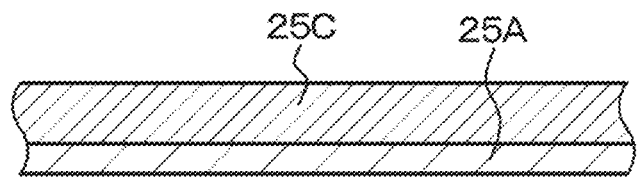
FIG. 1B and FIG. 1C are schematic partial cross-sectional views of the negative electrode for magnesium secondary batteries before and after a chemical plating treatment according to an embodiment of the present technology.
Figure 1C:
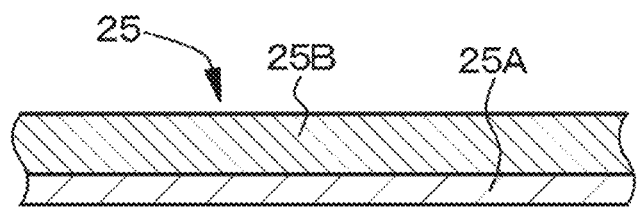

The schematic illustration of a magnesium secondary battery 10 in Example 1 in a broken-down state is shown in FIG. 1A, and schematic partial cross-sectional views of a negative electrode for magnesium secondary batteries before and after a chemical plating treatment are shown in FIGS. 1B and 1C. A negative electrode 25 for magnesium secondary provided with a current collector batteries in Example 1 is 25A and a negative electrode active material layer 25B formed on the surface of the current collector 25A and made from magnesium. The value of BET specific surface area of the negative electrode active material layer 25B is 1 $m^2$ or more, preferably 10 $m^2$ or more, per 1 g of the negative electrode active material layer. The negative electrode active material layer 25B may be formed on one surface or both surfaces of the current collector 25A. In the example shown in the drawings, the negative electrode active material layer 25B is formed on one surface of the current collector 25A. The magnesium secondary battery of Example 1 is provided with the negative electrode for magnesium secondary batteries of Example 1.

The negative electrode for magnesium secondary batteries was produced in the following manner. That is, a current collector 25A having, formed on the surface thereof, an underlying layer 25C containing a metal having a higher ionization tendency than that of magnesium (concretely lithium, Li) is provided. More concretely, a laminate foil having a (copper foil)/(lithium foil) laminated structure is provided by pressure-bonding a lithium foil (an underlying layer 25C) having a thickness of 50 μm onto one surface of a copper foil (a current collector 25A) having a thickness of 10 μm (see FIG. 1B). The laminate foil was punched into a piece having a diameter of 15 mm. A negative electrode active material layer composed of a magnesium layer was formed on the current collector by a chemical plating method using the underlying layer as a base material. Alternatively, magnesium was allowed to be precipitated by replacing the metal constituting the underlying layer by magnesium by a chemical plating method to form a negative electrode active material layer 25B composed of a magnesium layer on the current collector 25A (see FIG. 1C).

Concretely, the laminate foil was immersed in a plating solution in a volume of 1.5 ml per one laminate foil in a vessel made from a tetrafluoroethylene-(perfluoroalkyl vinyl ether) copolymer (PFA) in a glove box under an argon gas atmosphere. The plating solution had a composition of $MgCl_2$:EnPS=(1 mole/1):(8 moles/1). The laminate foil was immersed in the plating solution for 150 hours. Subsequently, the plating solution was removed form the laminate foil, then the laminate foil was washed with a fresh plating solution, and then the plating solution was further removed.

Figure 2:
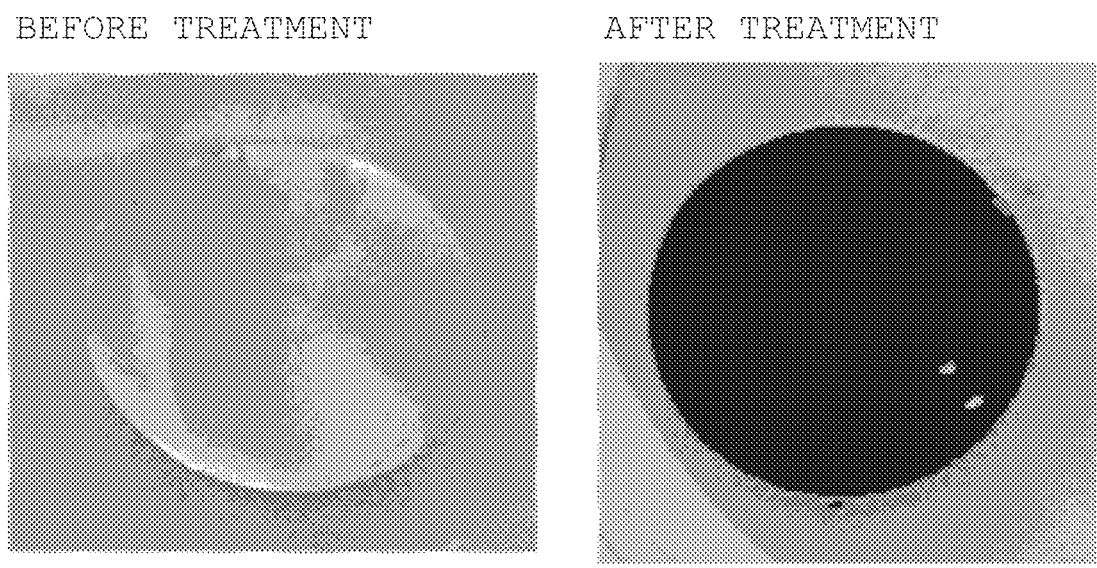
FIG. 2 shows photographs of a laminate foil (a lithium foil side) composed of a copper foil/a lithium foil before and after a chemical plating treatment according to an embodiment of the present technology.

The photographs of the laminate film before and after the chemical plating treatment are shown in FIG. 2. Before the chemical plating treatment, silver metallic gloss (the surface in the photograph was a lithium foil) was confirmed. After the immersion treatment in a chemical plating solution, it was confirmed that the surface was coated with black precipitates. Two hours after the start of the immersion in the plating solution, the surface of the lithium foil was discolored. This result suggested that a phenomenon that lithium was replaced by magnesium to cause the precipitation of magnesium proceeded after the lapse of 2 hours and there was a possibility that the chemical plating was completed within a very short time.

The precipitates after the chemical plating treatment was scraped off from the copper foil, and the precipitates were subjected to an elemental analysis by inductively coupled plasma mass spectrometry (ICP-MS). As a result, the precipitates contained 99% by mass of magnesium and 1% by mass or lithium. That is, as the result of the elemental analysis, it was found that almost all of lithium was replaced by magnesium. In this regard, it was highly probable that 1% by mass of lithium was derived from the plating solution (i.e., eluted lithium). In Example 1, the metal (lithium) constituting the underlying layer was replaced by magnesium to cause the precipitation of magnesium, thereby forming the magnesium layer on the current collector. That is, the metal constituting the underlying layer was replaced by magnesium to cause the precipitation of magnesium, thereby forming the magnesium layer. These results demonstrated that a very high-purity magnesium layer was able to be formed the chemical plating treatment without needing to perform any treatment such as power distribution.

In addition, the measurement of a BET (Brunauer-Emmett-Teller) specific surface area was carried out. As a result, it was demonstrated that the BET specific surface area was 41.8 $m^2$ per 1 g of the negative electrode active material layer (magnesium layer). The BET specific surface area of a metal magnesium plate was 0.01 $m^2$. It was confirmed that a magnesium layer having a large specific surface area was formed by the chemical plating treatment.

In Example 1, a magnesium secondary battery (a coin battery type CR2016) was produced, in which the positive electrode contained sulfur (S) and the negative electrode contained magnesium. Concretely, the coin battery was produced using magnesium (Mg) as the negative electrode and using sulfur (S) as the positive electrode. The broken-down state of the magnesium secondary battery (concretely a coin battery 10) of Example 1 was shown in the schematic illustration in FIG. 1A. In the assembling of the coin battery 10, a gasket 22 was placed on a coin battery can 21, then a sulfur-made positive electrode 23, a separator 24 composed of a polypropylene-made porous membrane, a negative electrode 25 having a diameter of 1.5 mm (a negative electrode current collector 25A composed of a Cu plate having a thickness of 10 μm and a negative electrode active material layer 25B formed on the negative electrode current collector 25A), a spacer 26 composed of a stainless steel sheet having a thickness of 0.2 μm and a coin battery lid 27 were laminated thereon in this order, and then the coin battery can 21 was crimped and sealed. The spacer 26 was spot-welded to the coin battery lid 27 in advance. The separator 24 contained an electrolytic solution.

The positive electrode 23 has such a structure that a positive electrode mix sheet is embedded in a nickel-made mesh (i.e., a pellet positive electrode structure). The positive electrode mix sheet contains sulfur ($S_8$) in an amount of 10% by mass, and also contains Ketjen black in an amount of 65% by mass as a conductive additive, and also contains PTFE in an amount of 25% by mass as a binder. The positive electrode mix sheet was produced by dispersing these components in acetone, then compression-molding the resultant dispersion, and then drying the compression-molded product under a vacuumed atmosphere at 70° C. for 12 hours.

The electrolytic solution contains a sulfone and a magnesium salt (concretely a magnesium halide, more concretely $MgX_2$ (X=Cl, Br, I), still more concretely $MgCl_2$) dissolved in the sulfone. The sulfone is composed of an alkylsulfone represented by $R_1R_2SO_2$ (wherein $R_1$ and $R_2$ independently represent an alkyl group), and is concretely composed of ethyl-n-propyl sulfone (EnPS). More concretely, the electrolytic solution is composed of $MgCl_2$:EnPS=1:8 (by mole).

In a magnesium secondary battery of Comparative Example 1, a negative electrode was produced from a metal magnesium plate. Concretely, a metal magnesium plate having a thickness of 0.25 mm was punched into a circular piece having a diameter of 15 mm, and then the circular piece was carefully polished with sandpaper in a glove box under an argon gas atmosphere to perform the removal of an oxidative coating film from the surface of the piece. The magnesium secondary battery of Comparative Example 1 was assembled in the same manner as for the magnesium secondary battery of Example 1, except the above-mentioned respects and except that no spacer 26 was used.

A charge-discharge test was carried out under the test conditions shown in Table 1.

<Table 1>

Discharge conditions: 0.1 milliampere/cut-off voltage 0.7 volt

Charge conditions: 0.1 milliampere/cut-off voltage 2.5 volts

Test environment: 25° C.

Figure 3:
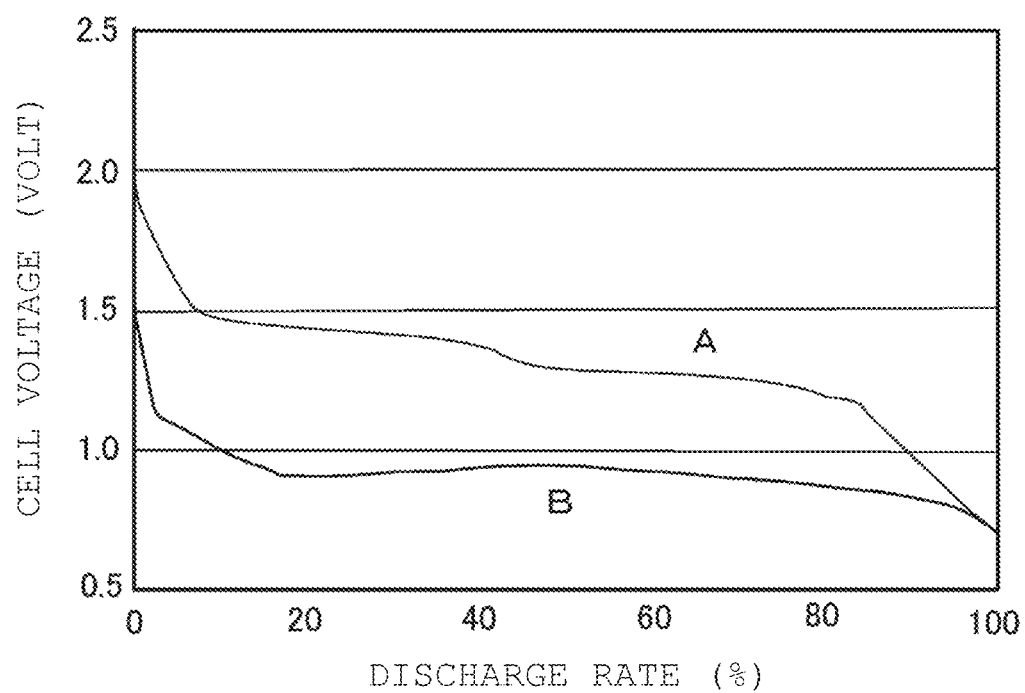
FIG. 3 is a graph showing discharge curves of a magnesium secondary battery of Example 1 and a magnesium secondary battery of Comparative Example 1 according to an embodiment of the present technology.

The discharge curves of the magnesium secondary battery of Example 1 and the magnesium secondary battery of Comparative Example 1 are shown in FIG. 3. The discharge rate on the transverse axis is a value standardized by employing the maximum discharge capacity of the magnesium secondary batteries of Example 1 and Comparative Example 1 as 100%. In FIG. 3, "A" shows the result of Example 1, and "S" shows the result of Comparative Example 1. It was found that, in the magnesium secondary battery of Example 1, the cell voltage during discharging was largely increased compared with that in the magnesium secondary battery of Comparative Example 1. The average discharge voltage of the magnesium secondary battery of Comparative Example 1 was 0.92 volt, while the average discharge voltage or the magnesium secondary battery of Example 1 was 1.30 volts. In this manner, the average discharge voltage was increased by about 0.4 volt. When the cycle properties were compared, the cycle deterioration rate of the magnesium secondary battery of Example 1 was 90% when the cycle deterioration rate of the magnesium secondary battery of Comparative Example 1 was defined as "100%", and therefore an effect to improve the cycle property by 10% was observed. The cycle deterioration rate is expressed by the following formula.

$$\text{Cycle deterioration rate} = \{1-(\text{discharge capacity after 4 charge-discharge cycles})/(\text{initial discharge capacity})\} \times 100(\%)$$

As described above, a magnesium secondary battery provided with a negative electrode active material layer formed by a chemical plating method (concretely a magnesium-sulfur secondary battery) is greatly improved in a discharge voltage and is also improved in cycle properties compared with a magnesium secondary battery using a metal magnesium plate as a negative electrode. It is assumed that a magnesium layer formed by a chemical plating method has a very large specific surface area compared with a metal magnesium plate, and therefore a reaction interface between a negative electrode active material and an electrolytic solution increases, resulting in the great reduction of an overvoltage during discharging. With respect to the improvement in cycle properties, it is considered that the load during a charge-discharge reaction is reduced for the same reasons and side reactions or the like are also reduced. Consequently, a magnesium secondary battery that has high performance and can be produced at a reduced production cost can be produced by forming a negative electrode active material layer composed of a magnesium layer by a chemical plating method. The cost for the formation of a magnesium layer (a negative electrode active material layer) by a chemical plating method is more inexpensive than that for the production or a magnesium foil by a rolling method or the cost for the formation of a magnesium layer by an electroplating method or a deposition method, and the formation of the magnesium layer (the negative electrode active material layer) by a chemical plating method is highly safe.

Example 2 relates to a method producing the negative electrode for magnesium secondary batteries according to another embodiment of the present disclosure.

Lithium has excellent ductility, and therefore it becomes possible to form a magnesium layer having a desired thickness easily by altering the thickness of a lithium layer that serves as an underlying layer. On the other hand, when the metal constituting an underlying layer is replaced by magnesium by a chemical plating method, the thickness of the underlying layer is generally limited to about several tens micrometers.

The method for producing a negative electrode for magnesium secondary batteries of Example 2 includes the steps of:

providing a current collector having, formed on the surface thereof, a $1^{st}$ underlying layer containing a metal having a higher ionization tendency than that of magnesium;

(A) forming a $1^{st}$ magnesium layer on the current collector by a chemical plating method using the $1^{st}$ underlying layer as a base material, and (B) subsequently repeating a process as mentioned below from n=1 to n=N−1 to form a negative electrode active material layer composed of magnesium layers laminated on each other on the current collector, wherein the process includes:

forming a $(n+1)^{th}$ underlying layer containing a metal having a higher ionization tendency than that of magnesium on a $n^{th}$ (wherein n=1, 2, . . . , N−1; and N represents an integer of 2 or greater) magnesium layer; and forming a $(n+1)^{th}$ magnesium layer on the $n^{th}$ magnesium layer by a chemical plating method using the $(n+1)^{th}$ underlying layer as a base material.

Alternatively, in Example 2, the method includes the steps of:

providing a current collector having, formed on the surface thereof, a $1^{st}$ underlying layer containing a metal having a higher ionization tendency than that of magnesium;

(A) replacing the metal constituting the $1^{st}$ underlying layer by magnesium by a chemical plating method to cause the precipitation of magnesium, thereby forming a $1^{st}$ magnesium layer on the current collector, and (B) subsequently repeating a process as mentioned below from n=1 to n=N−1, or repeating the step of forming a $(n+1)^{th}$ magnesium layer on a $n^{th}$ magnesium layer from n=1 to n=N−1 to form a negative electrode active material layer composed of magnesium layers laminated on each other on the current collector, wherein the process includes:

forming a $(n+1)^{th}$ underlying layer containing a metal having a higher ionization tendency than that of magnesium on a $n^{th}$ (wherein n=1, 2, . . . , N−1; and N represents an integer of 2 or greater) magnesium layer; and replacing the metal constituting the $(n+1)^{th}$ underlying layer by magnesium by a chemical plating method to cause the precipitation of magnesium, thereby forming a $(n+1)^{th}$ magnesium layer on the $n^{th}$ magnesium layer.

In the method for producing a negative electrode for magnesium secondary batteries of Example 2, the $(n+1)^{th}$ underlying layer is formed by an electroplating method.

Concretely, firstly a laminate foil in which a lithium foil having a thickness of 50 μm is laminated on a copper foil having a thickness of 10 μm is provided in the same manner as in Example 1. The metal constituting a $1^{st}$ underlying layer (concretely lithium) is replaced by magnesium by a chemical plating method in the same manner as in Example 1, thereby causing the precipitation of magnesium. In this manner, a $1^{st}$ magnesium layer is formed on a current collector. Alternatively, a $1^{st}$ magnesium layer is formed on the current collector by a chemical plating method using the $1^{st}$ underlying layer as a base material.

Subsequently, a $(n+1)^{th}$ $(=2^{nd})$ underlying layer (a $2^{nd}$ lithium layer) containing a metal having a higher ionization tendency than that of magnesium (concretely lithium) is formed on a $n^{th}$ (wherein n=1, i.e., $1^{st}$) magnesium layer, and then the metal (lithium) constituting the $(n+1)^{th}$ underlying layer ($2^{nd}$) is replaced by magnesium by a chemical plating method to cause the precipitation of magnesium, thereby forming the $(n+1)^{th}$ $(=2^{nd})$ magnesium layer on the $n^{th}$ $(=1^{st})$ magnesium layer. Alternatively, $(n+1)^{th}$ $(=2^{nd})$ underlying layer containing a metal having a higher ionization tendency than that of magnesium is formed on a $n^{th}$ $(=1^{st})$ magnesium layer, and then a $(n+1)^{th}$ magnesium layer is formed on the $n^{th}$ magnesium layer by a chemical plating method using the $(n+1)^{th}$ underlying layer as a base material. In the case where N=2, the formation of a magnesium layer (a negative electrode active material layer) is completed by the above-mentioned process.

In the case where N=3, subsequently a $(n+1)^{th}$ $(=3^{rd})$ underlying layer (a $3^{rd}$ lithium layer) containing a metal having a higher ionization tendency than that of magnesium (concretely lithium) is formed on a $n^{th}$ (wherein n=2, $2^{nd}$) magnesium layer, and the metal (lithium) constituting the $(n+1)^{th}$ underlying layer ($3^{rd}$) is replaced by magnesium by a chemical plating method to cause the precipitation of magnesium, thereby forming a $(n+1)^{th}$ $(=3^{rd})$ magnesium layer on the $n^{th}$ $(=2^{nd})$ magnesium layer. Alternatively, a $(n+1)^{th}$ $(=3^{rd})$ underlying layer containing a metal having higher ionization tendency than that of magnesium is formed on a $n^{th}$ $(=2^{nd})$ magnesium layer, and then a $(n+1)^{th}$ magnesium layer is formed on the $n^{th}$ magnesium layer by a chemical plating method using the $(n+1)^{th}$ underlying layer as a base material. In the case where N=3, the formation of a magnesium layer (a negative electrode active material layer) is completed by the above-mentioned process.

As mentioned above, in the method for producing a negative electrode for magnesium secondary batteries of Example 2, a magnesium layer having desired thickness can be produced by defining the thickness of the $n^{th}$ underlying layer and the value of N.

In Example 3, a cylindrical secondary battery and a flat-plate-shaped laminate-film-type secondary battery are described.

Figure 4:
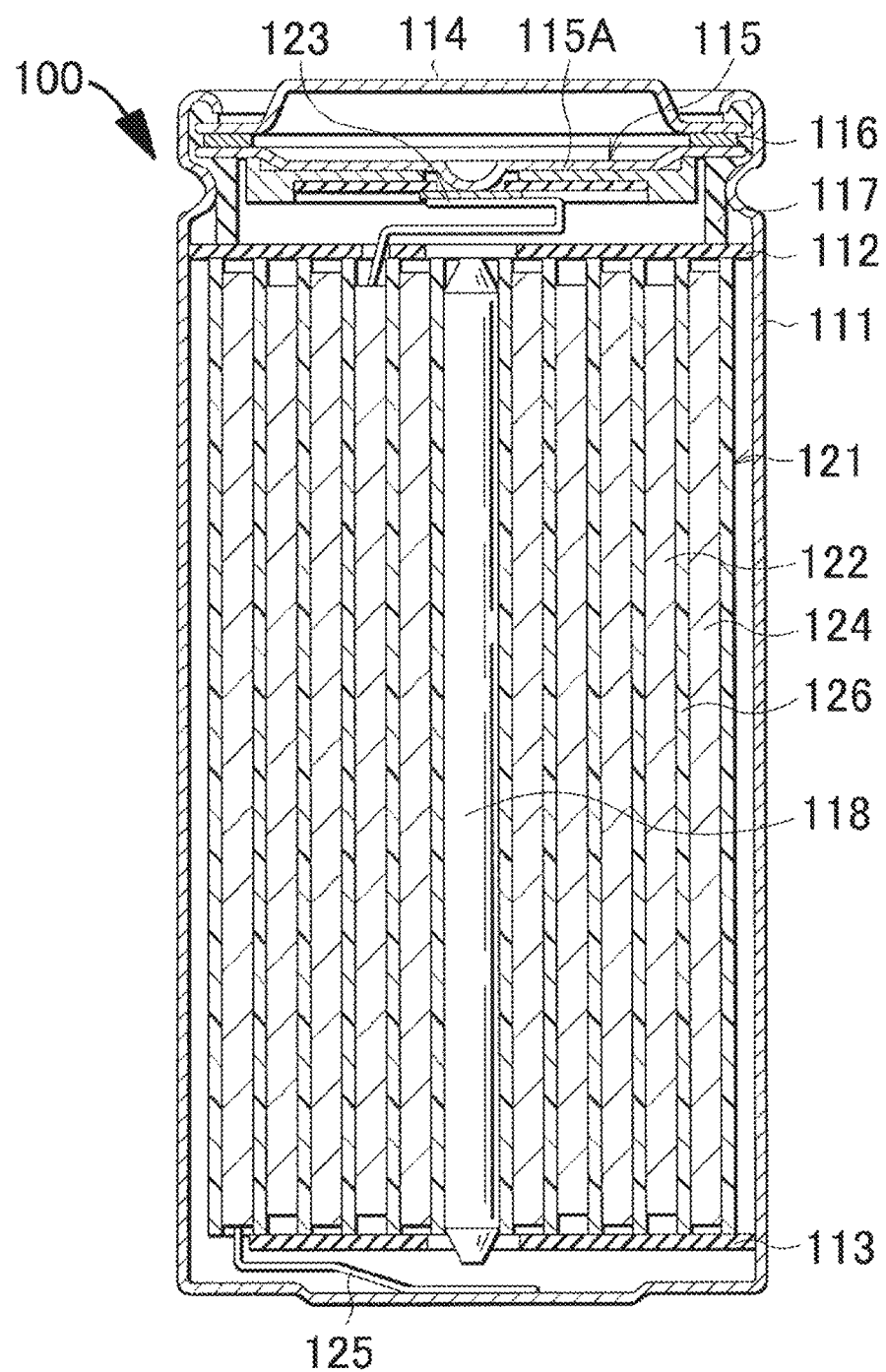
FIG. 4 is a schematic cross-sectional view of a magnesium secondary battery of Example 3 according to embodiment of the present technology.
Figure 5:
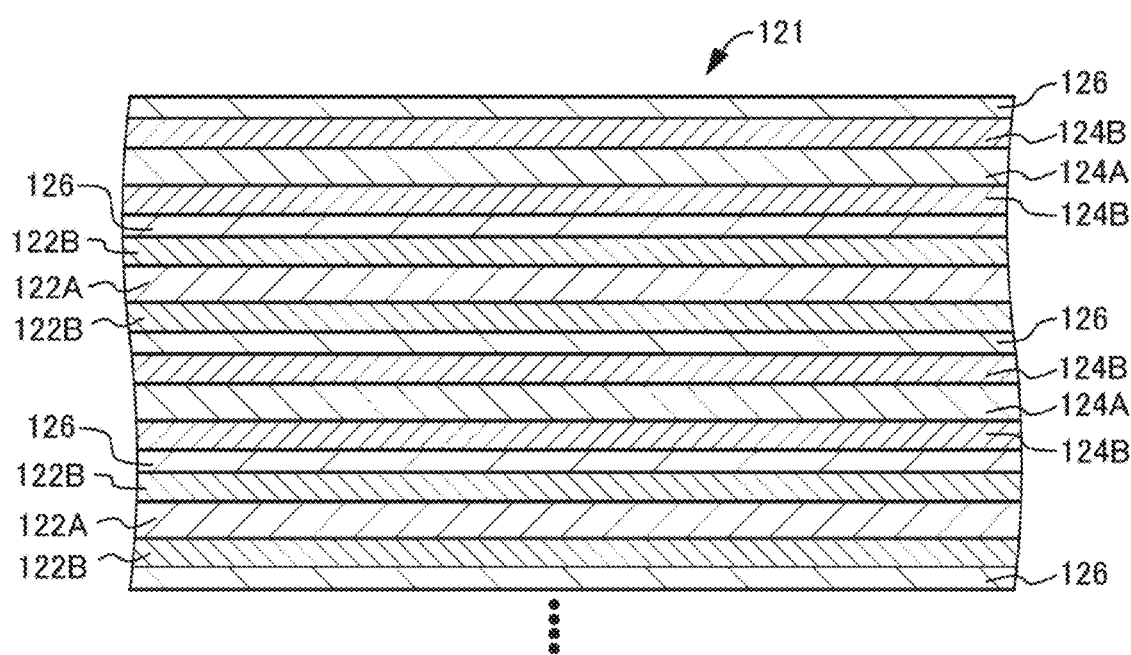
FIG. 5 is a schematic partial cross-sectional view of a wound electrode laminate in a magnesium secondary battery of Example 3 according to an embodiment of the present technology.

A magnesium secondary battery 100 is composed of a cylindrical secondary battery. The schematic cross-sectional view of a cylindrical magnesium secondary battery 100 is shown in FIG. 4. The schematic partial cross-sectional view of an electrode structure constituting the secondary battery as observed in a direction along the length direction of the electrode structure is shown in FIG. 5. FIG. 5 is a schematic partial cross-sectional view of a part in which a positive electrode lead part or a negative electrode lead part is not arranged, and the electrode structure is illustrated flatly for the sake of simplification. However, actually the electrode structure is wound and is therefore curved.

In the magnesium secondary battery 100, an electrode structure 121 and a pair of insulating plates 112 and 113 are housed in the inside of an almost hollow columnar electrode structure housing member 111. The electrode structure 121 can be produced by, for example, laminating a positive electrode 122 and a negative electrode 124 together with a separator 126 interposed therebetween to produce an electrode structure and then winding the electrode structure.

The electrode structure housing member (a battery can) 111 has such a hollow structure in which one end is closed and the other end is opened, and is made from iron (Fe), aluminum (Al) or the like. The surface of the electrode structure housing member 111 may be plated with nickel (Ni) or the like. The pair of insulating plates 112 and 113 are arranged so as to sandwich the electrode structure 121 therebetween and extend vertically relative to the winding periphery of the electrode structure 121. At the opened end of the electrode structure housing member 111, a battery lid 114, a safety valve mechanism 115 and a heat-sensing resistive element (a PTC element, a positive temperature coefficient element) 116 are crimped together through a gasket 117, whereby the electrode structure housing member 111 is tightly sealed. The battery lid 114 is made from, for example, the same material as that for the electrode structure housing member 111. The safety valve mechanism 115 and the heat-sensing resistive element 116 are arranged inside of the battery lid 114, and the safety valve mechanism 115 is connected electrically to the battery lid 114 through the heat-sensing resistive element 116. In the safety valve mechanism 115, a disk plate 115A is inverted when the internal pressure reaches a specific value or higher due to the occurrence of internal short circuit, the heating from the outside or the like. As a result, the electrical connection between the battery lid 114 and the electrode structure 121 is disconnected. For the purpose of preventing the abnormal heat generation due to a high current, the resistivity of the heat-sensing resistive element 116 increases in accordance with the increase in temperature. The gasket 117 is made from, for example, an insulating material. The surface of the gasket 117 may be coated with asphalt or the like.

At the winding center of the electrode structure 121, a center pin 118 is inserted. The center pin 118 is not necessarily inserted at the winding center. A positive electrode lead part 123 made from a conductive material such as aluminum is connected to the positive electrode 122. Concretely, the positive electrode lead part 123 is attached to the positive electrode current collector 122A. A negative electrode lead part 125 made from a conductive material such as copper is connected to the negative electrode 124. Concretely, the negative electrode lead part 125 is attached to the negative electrode current collector 124A. The negative electrode lead part 125 is welded to the electrode structure housing member 111 so as to be connect electrically to the electrode structure housing member 111. The positive electrode lead part 123 is welded to the safety valve mechanism 115 and is electrically connected to the battery lid 114. In the example shown in FIG. 4, the negative electrode lead part 125 is provided at one site (i.e., the outermost periphery of the wound electrode structure). However, the negative electrode lead part 125 may be provided at two sites (i.e., the outermost periphery and the innermost per of the wound electrode structure).

The electrode structure 121 has such a structure that a positive electrode 122, in which a positive electrode active material layer 122B is formed on a positive electrode current collector 122A (concretely on both surfaces of the positive electrode current collector 122A), and a negative electrode 124, in which a negative electrode active material layer 129E is formed on a negative electrode current collector 124A (concretely on both sides of the negative electrode current collector 124A), are laminated on each other with a separator 126 interposed therebetween. In a region in the positive electrode current collector 122A to which a positive electrode lead part 123 is to be attached, the positive electrode active material layer 122B is not formed. In a region in the negative electrode current collector 124A to which a negative electrode lead part 125 is to be attached, the negative electrode active material layer 124B is not formed.

The negative electrode active material layer 124, on the negative electrode current collector 124A can be formed by the method described in Examples 1 to 2.

The specification of the magnesium secondary battery 100 in Example 3 is exemplified in Table 2 below, but is not limited thereto.

<Table 2>

Positive electrode current collector 122A: an aluminum foil having a thickness of 20 μm.

Positive electrode active material layer 122B: a thickness of 50 μm per one side Positive electrode lead part 123: an aluminum (Al) foil having a thickness of 100 μm.

Negative electrode current collector 124A: a copper foil having a thickness of 20 μm.

Negative electrode active material layer 124B: a thickness of 50 μm per one side Negative electrode lead part 125: a nickel (Ni) foil having a thickness of 100 μm.

The magnesium secondary battery 100 can be produced by, for example, the following procedures.

Firstly a positive electrode active material layer 122B is formed on both surfaces of a positive electrode current collector 122A and a negative electrode active material layer 124B is formed on both surfaces of a negative electrode current collector 124A in the same manner as mentioned above.

Subsequently, a positive electrode lead part 123 is attached to the positive electrode current collector 122A by a welding method or the like. A negative electrode lead part 125 is attached to the negative electrode current collector 124A by a welding method or the like. Subsequently, a positive electrode 122 and a negative electrode 124 are laminated on each other and wound with a separator 126 made from a microporous polyethylene film having a thickness of 20 μm interposed therebetween (more concretely, wind an (positive electrode 122)/(separator 126)/(negative electrode 124)/(separator 126) electrode structure (multi-layer structure)) to produce an electrode structure 121, and then a protective tape (not shown) is attached to the outermost periphery. Subsequently, a center pin 118 is inserted to the center of the electrode structure 121. Subsequently, the electrode structure 121 is housed in the inside of an electrode structure housing member (battery can) 111 while sandwiching the electrode structure 121 by a pair of insulating plates 112 and 113. In this case, a tip part of the positive electrode lead part 123 is attached to a safety valve mechanism 115 and a tip part of the negative electrode lead part 125 is attached to the electrode structure housing member 111 by a welding method or the like. Subsequently, an organic electrolytic solution or a non-aqueous electrolytic solution is injected in a pressure-reduced mode to allow the separator 126 to be impregnated with the organic electrolytic solution or the non-aqueous electrolytic solution. Subsequently, the battery lid 114, the safety valve mechanism 115 and the heat-sensing resistive element 116 are crimped to an open end of the electrode structure housing member 111 with the gasket 117 interposed therebetween.

Figure 6:
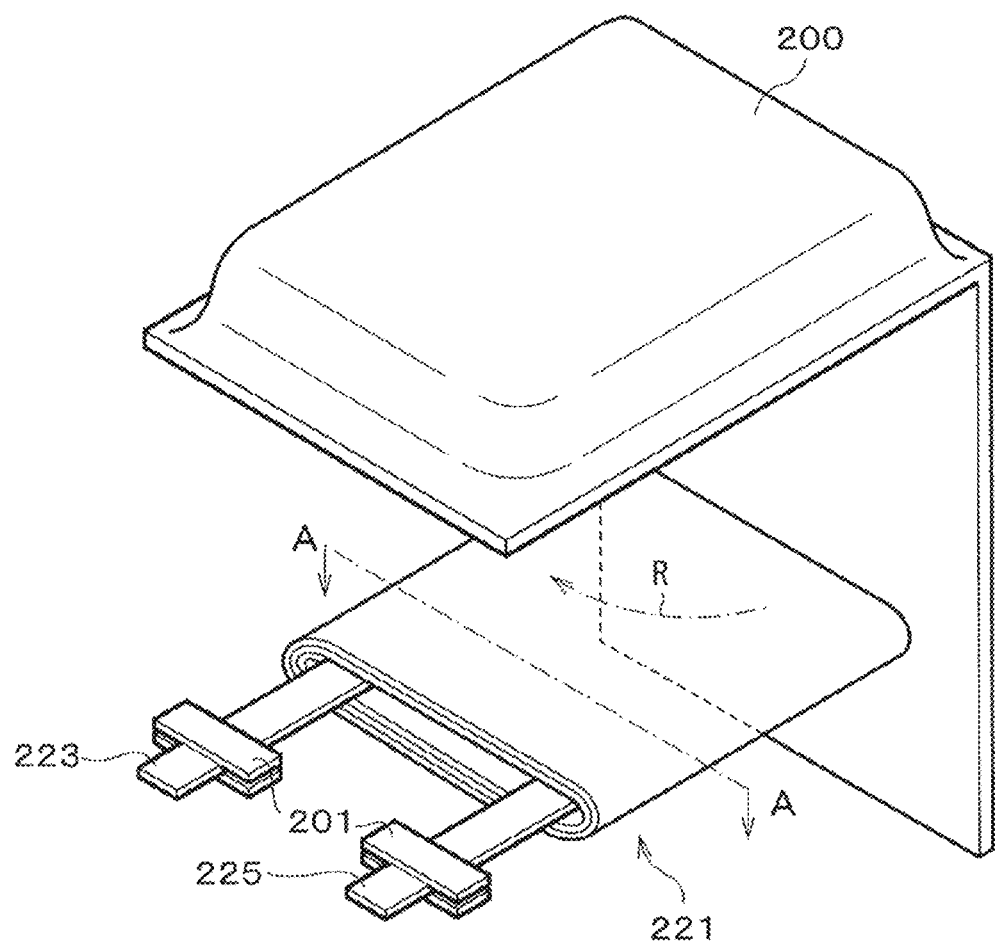
FIG. 6 is a schematic exploded perspective view of a laminate-film-type rectangular magnesium secondary battery of Example 3 according to an embodiment of the present technology.
Figure 7A:
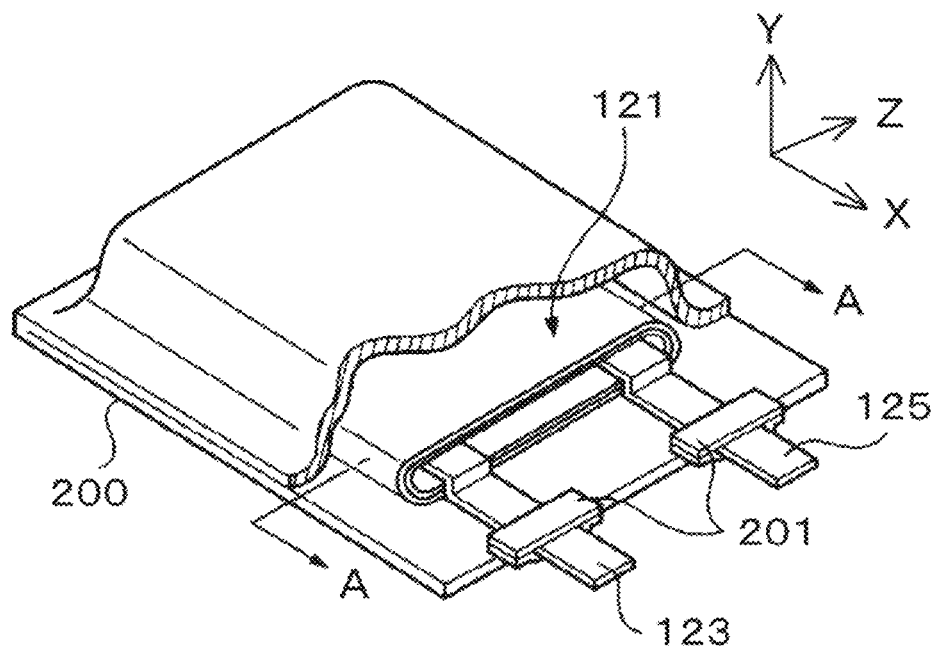
FIG. 7A is a schematic exploded perspective view of a laminate-film-type magnesium secondary battery of Example 3 which is an embodiment different from that shown in FIG. 6.
Figure 7B:
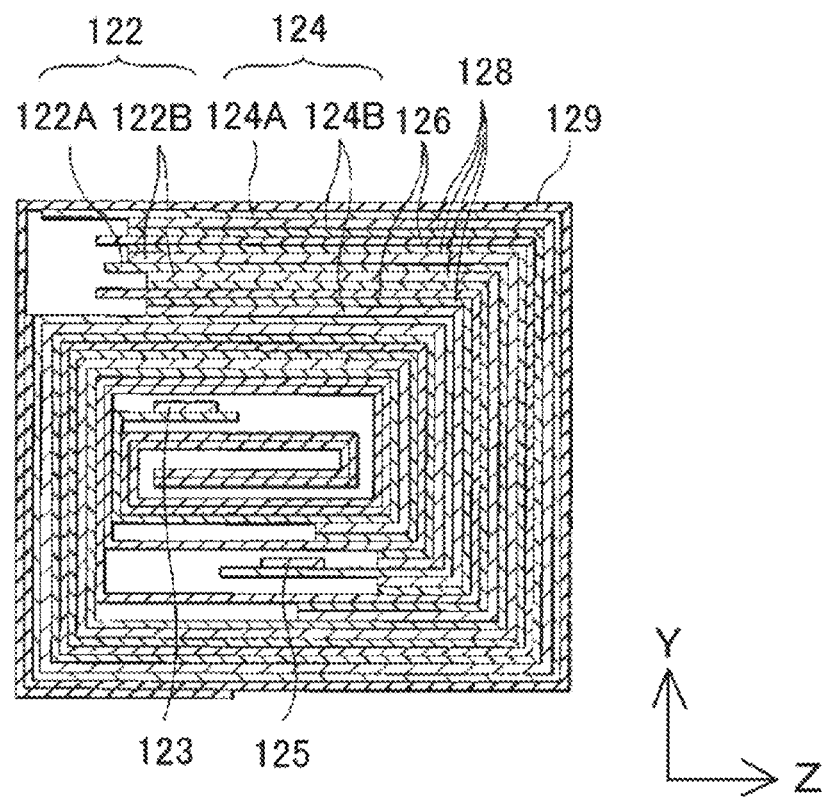
FIG. 7B is a schematic cross-sectional view of an electrode structure in the laminate-film-type magnesium secondary battery of Example 3 which is taken along arrows A-A in FIG. 6 and FIG. 7A according to an embodiment of the present technology.

Subsequently, a flat-plate-shaped laminate-film-type secondary battery is described. The schematic exploded perspective view of the secondary battery is shown in FIGS. 6 and 7A, and a schematic enlarged cross-sectional view of the electrode structure (multilayer structure) shown in FIG. 7A which is taken along the arrow A-A (i.e., a schematic enlarged cross-sectional view taken along a YZ plane) is shown in FIG. 7B. The schematic partial cross-sectional view which is an enlarged view of a part of the electrode structure shown in FIG. 7B (a schematic partial cross-sectional view taken along a XY plane) is the same as that shown in FIG. 5.

In the secondary battery, an electrode structure 221 that is basically the same as that mentioned above is housed in the inside of an exterior member 200 composed of a laminate film. The electrode structure 221 can be produced by laminating a positive electrode 222 and a negative electrode 224 on each other with a separator 226 and an electrolyte layer 228 interposed therebetween, and then winding a resultant laminate structure. A positive electrode lead part 223 is attached to the positive electrode 222, and a negative electrode lead part 225 is attached to the negative electrode. The outermost periphery of the electrode structure 221 is protected by a protective tape 229.

The positive electrode lead part 223 and the negative electrode lead part 225 are protruded in the same direction from inside of the exterior member 200 toward the outside of the exterior member 200. The positive electrode lead part 223 is made from a conductive material such as aluminum. The negative electrode lead part 225 is made from a conductive material such as copper, nickel and stainless steel.

The exterior member 200 is a sheet of film that can be folded in a direction shown by an arrow R shown in FIG. 6, and a groove (emboss) in which the electrode structure 221 is to be housed is provided in a part of the exterior member 200. The exterior member 200 is a laminate film composed of, for example, a fusion layer, a metal layer and a surface-protecting layer laminated in this order. In the process for producing the secondary battery, the exterior member 200 is folded so that folded parts of the exterior member 200 can face each other with the electrode structure 221 interposed therebetween, and then the outermost peripheral parts of the fusion layer are fused to each other. The exterior member 200 may be one produced by bonding two laminate films to each other with an adhesive agent or the like. The fusion layer is composed of, for example, a polyethylene film, a polypropylene film or the like. The metal layer is composed of, for example, an aluminum foil or the like. The surface-protecting layer is made from, for example, nylon, polyethylene terephthalate or the like. The exterior member 200 is preferably an aluminum laminate film in which a polyethylene film, an aluminum foil and a nylon film are laminated in this order. Alternatively, the exterior member 200 may be a laminate film having anther multilayer structure, or may be a polymer film such as a polypropylene film, or may be a metal film. Concretely, the exterior member 200 is composed of a moisture-resistant aluminum laminate film (total thickness: 100 μm) in which a nylon film (thickness: 30 μm), an aluminum foil (thickness: 40 μm) and a non-oriented. Polypropylene film (thickness: 30 μm) are laminated in this order as observed from the outside.

In order to prevent the invasion of outside air, an adhesive film 201 is inserted between the exterior member 200 and the positive electrode lead part 223 and between the exterior member 200 and the negative electrode lead part 225. The adhesive film 201 is made from a material having adhesiveness to the positive electrode lead part 223 and the negative electrode lead part 225, such as a polyolefin resin, more concretely a polyolefin resin such as a polyethylene resin, a polypropylene resin, a modified polyethylene resin, a modified polypropylene resin or the like.

As shown in FIG. 7B, in the positive electrode 222, a positive electrode active material layer 222B is provided on one surface or both surfaces of the positive electrode current collector 222A. In the negative electrode 224, a negative electrode active material layer 224B is provided on one surface or both surfaces of the negative electrode current collector 224A.

The negative electrode active material layer 224B on the negative electrode current collector 224A can be formed by the method described in Examples 1 to 2.

Figure 8A:
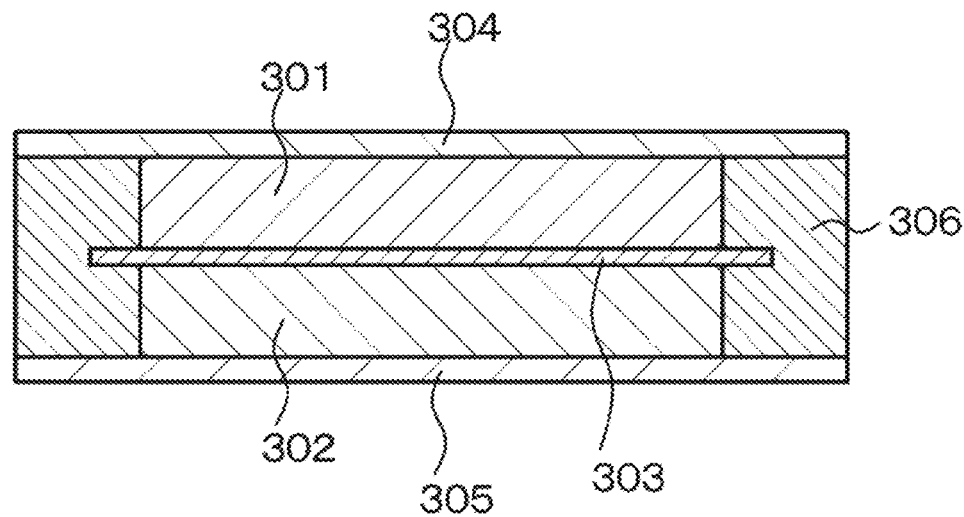
FIG. 8A and FIG. 8B are a schematic cross-sectional view of an electrochemical device (a capacitor) of Example 4 and a conceptual view of an air battery of Example 4, respectively according to an embodiment of the present technology.
Figure 8B:
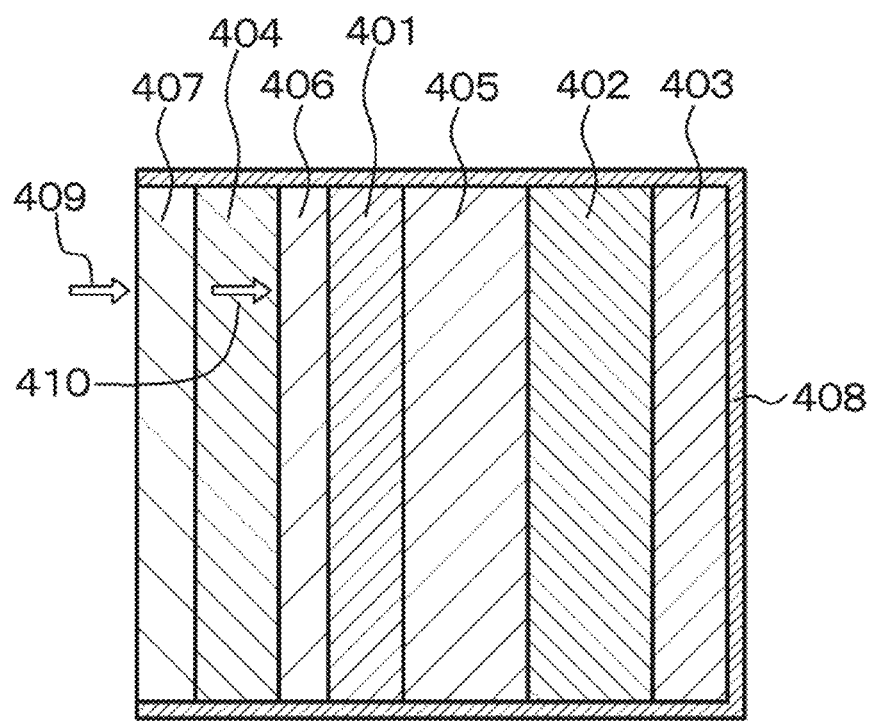

Example 4 is a variation of Examples 1 to 2. The schematic cross-sectional view of an electrochemical device of Example 4 is shown in FIG. 8A. As shown in the drawing, the electrochemical device of Example 4 is composed of a capacitor, in which a positive electrode 301 and a negative electrode 302 are arranged so as to face each other with a separator 303 impregnated with an electrolytic solution interposed therebetween. Reference Nos. 304 and 305 show current collectors, and reference No. 306 shows a gasket. A current collector and a negative electrode active material which constitute the negative electrode 302 and the current collector 305 are respectively composed of the current collector and the negative electrode active material described in Examples 1 to 2.

Alternatively, the electrochemical device of Example 4 may also be composed of an air battery, and the conceptual view of the electrochemical device is shown in FIG. 8E. The air battery is composed of, for example, an oxygen-selective permeable membrane 407 through which water vapor hardly permeates and oxygen can permeate selectively, an air-electrode-side current collector 404 which is made from a conductive porous material, a porous diffusion layer 406 which is arranged between the air-electrode-side current collector 404 and the porous positive electrode 401 and is made from a conductive material, a porous positive electrode 401 which contains a conductive material and a catalyst material, a separator through which water vapor hardly permeates and an electrolytic solution (or a solid electrolyte containing an electrolytic solution) 405, a negative electrode 402 which can release magnesium ions, a negative-electrode-side current collector 403, and an exterior body 408 in which these layers are housed.

Oxygen 410 in an air atmosphere (atmospheric air) 409 selectively permeates through the oxygen-selective permeable membrane 407, then passes through the air-electrode-side current collector 404 made from a porous material, is then diffused by the diffusion layer 406, and is then supplied to the porous positive electrode 401. The flow of oxygen that has passed through the oxygen-selective permeable membrane 407 is partially blocked by the air-electrode-side current collector 404. However, oxygen that has passed through the air-electrode-side current collector 404 is diffused by the diffusion layer 406 and is then spread, and therefore the oxygen can be spread throughout the porous positive electrode 401 efficiently and the supply of the oxygen to the whole surface of the porous positive electrode 401 is never inhibited by the air-electrode-side current collector 404. In addition, since the permeation of water vapor is inhibited by the oxygen-selective permeable membrane 407, the deterioration of the battery due to the influence of water contained in an air atmosphere can be reduced, oxygen can be supplied throughout the porous positive electrode 401 efficiently, a battery output can be improved, and therefore the battery can be used stably for a long period.

In Example 5, application examples of the present disclosure are described.

The magnesium secondary batteries in the present disclosure which are described in Examples 1 to 4 can be used in a machine, a device, a tool, an apparatus or a system (an assembly composed of a plurality of devices) which can utilize a secondary battery as a power supply for the driving or operation thereof or as an electric power storage source for electric power storage purposes, without any limitation. The magnesium secondary battery to be used as a power supply (concretely a magnesium-sulfur secondary battery) may be a main power supply (i.e., a power supply that is used preferentially) or an auxiliary power supply (i.e., a power supply that is used in place of a main power supply or is switched from a main power supply upon use). In the case where the magnesium secondary battery is used as an auxiliary power supply, the main power supply is not limited to the magnesium secondary battery.

An example of the use application of the magnesium secondary battery in the present disclosure (concretely a magnesium-sulfur secondary battery) is, but is not limited to, the driving of: various electronic devices and electric devices (including mobile electronic devices), such as video cameras, camcorders, digital still cameras, mobile telephones, personal computers, television receivers, various display devices, codeless telephones, headphone stereo cassette players, music players, portable radios, electronic paper including electronic books and electronic newspaper, and mobile information terminals including PDAs; toys; portable domestic tools such as electric shavers; lighting tools such as room lamps; medical electronic devices such as pacemakers and hearing aids; storage devices such as memory cards; battery packs that can be used as removable power supplies in personal computers and the like; electric power tools such as electric power drills and electric power saws; electric power storage systems, home energy servers (household power storage devices) and electric power supply systems, such as household battery systems for storing electric power for emergencies or the like; power storage units and backup power supplies; electric vehicles such as electric automobiles, electric motorbikes, electric bicycles and Segway (registered trademark); and power driving force converting devices for aircrafts and ships (concretely power motors).

Among these items, the magnesium secondary battery in the present disclosure can be used effectively in battery packs, electric vehicles, electric power storage systems, electric power supply systems, electric power tools, electronic devices, electric devices and the like. A battery pack is a power supply using the magnesium secondary battery in the present disclosure, and is a so-called "assembled battery" or the like. An electric vehicle is a vehicle that can be operated (or can run) utilizing the magnesium secondary battery in the present disclosure as a driving power supply, and may be an automobile (a hybrid car or the like) that is additionally equipped with a driving power source other than a secondary battery. An electric power storage system (an electric power supply system) is a system utilizing the magnesium secondary battery in the present disclosure as a power storage source. For example, in an electric power storage system (an electric power supply system) for household use, an electric power is stored in the magnesium secondary battery in the present disclosure that serves as a power storage source, and electric appliances for household use or the like can be used utilizing the electric power. An electric power tool is a tool in which a movable member. (e.g., a drill) can move utilizing the magnesium secondary battery in the present disclosure as a driving power supply. An electronic device and an electric device are devices which can exhibit various functions thereof utilizing the magnesium secondary battery in the present disclosure as an operation power supply (a power supply source).

Hereinbelow, some application examples of the magnesium secondary battery in the present disclosure are described concretely. The configurations of the application examples described below are illustrative only, and can be modified appropriately.

A battery pack is a simplified battery pack (i.e., a so-called "soft pack") using one magnesium secondary battery in the present disclosure, and can be mounted in an electronic device typified by a smart phone or the like. Alternatively, the battery pack may be provided with an assembled battery composed of six magnesium secondary batteries in the present disclosure which are connected so as to have a 2 parallel×3 series configuration. The form of the connection of the magnesium secondary batteries may be in parallel, or in series, or in a mixture thereof.

Figure 9:
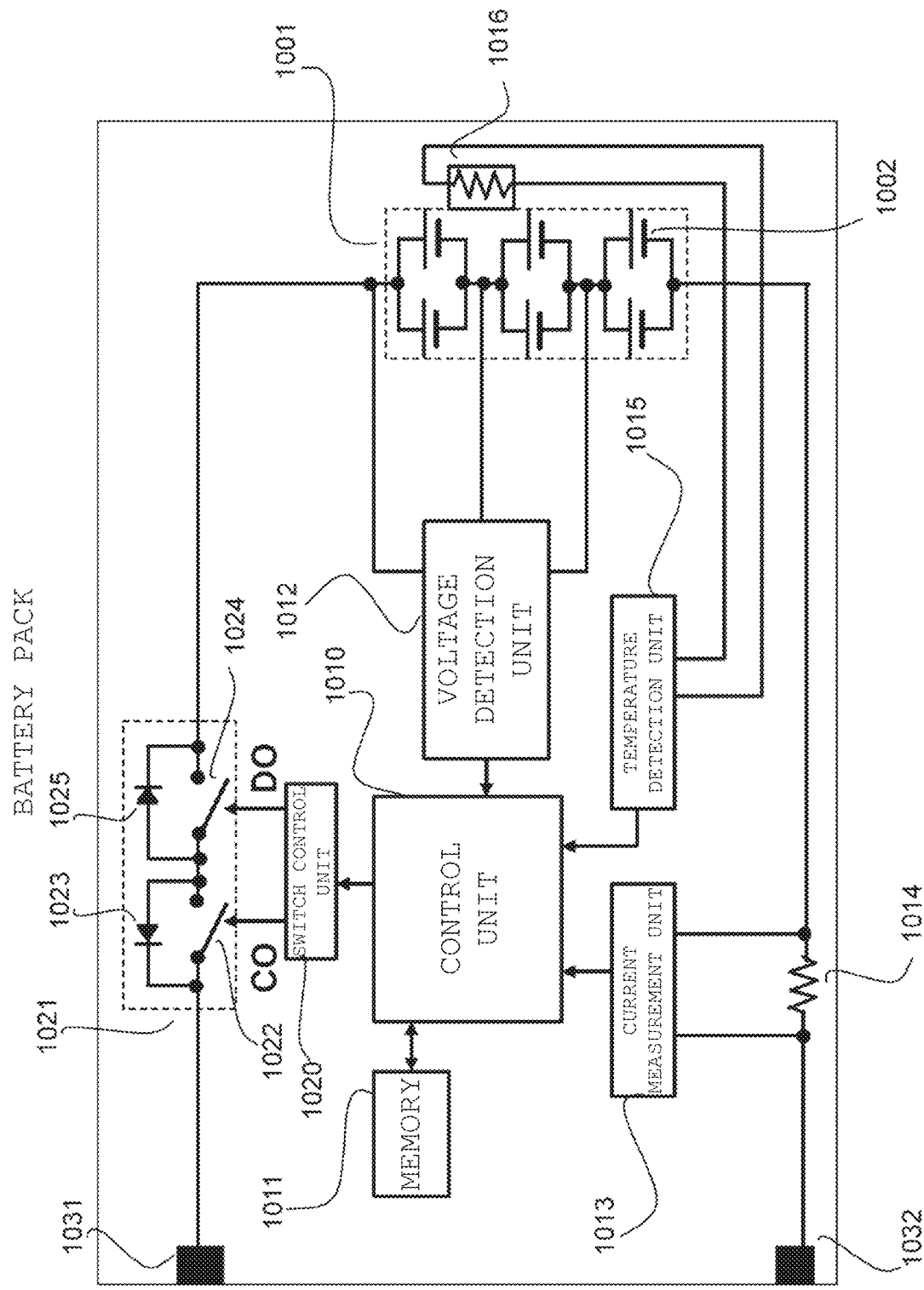
FIG. 9 is a block diagram showing a circuit structure example in which a magnesium secondary battery in the present disclosure described in Examples 1 to 4 is applied to a battery pack according to an embodiment of the present technology.

The block diagram showing a circuit configuration example in which the magnesium secondary battery in the present disclosure is used in a battery pack is shown in FIG. 9. The battery pack is provided with a cell (assembled battery) 1001, an exterior member, a switch unit 1021, a current detecting resistor 1014, a temperature detection element 1016 and a control unit 1010. The switching unit 1021 is provided with a charge control switch 1022 and a discharge control switch 1024. The battery pack is also provided with a positive electrode terminal 1031 and a negative electrode terminal 1032, wherein the positive electrode terminal 1031 and the negative electrode terminal 1032 are respectively connected to a positive electrode terminal and a negative electrode terminal in a battery charger during charging to achieve charging. During the use of the electronic device, the positive electrode terminal 1031 and the negative electrode terminal 1032 are respectively connected to the positive electrode terminal and the negative electrode terminal of the electronic device to achieve discharging.

The cell 1001 is composed of a plurality of the magnesium secondary batteries 1002 in the present disclosure which are connected in parallel and/or in series. In FIG. 9, a case where six magnesium secondary batteries 1002 are connected in a 2 parallel×3 series configuration (2P3S) is shown. However, the connection mode may be any one, such as a p parallel×q series (wherein p and g independently represent an integer).

The switching unit 1021 is provided with a charge control switch 1022 and a diode 1023 and a discharge control switch 1024 and a diode 1025, and can be controlled by a control unit 1010. The diode 1023 has a polarity in a backward direction relative to the flow direction of a charge current that flows in a direction from the positive electrode terminal 1031 toward the cell 1001 and also has a polarity in a forward direction relative to the flow direction of a discharge current that flows in a direction from the negative electrode terminal 1032 toward the cell 1001. The diode 1025 has a polarity in a forward direction relative to the flow direction of the charge current and also has a polarity in a backward direction relative to the flow direction of the discharge current. In this example, the switching unit is provided on a plus (+) side. However, the switching unit may be provided on a minus (−) side. The charge control switch 1022 comes in a closes state when the battery voltage becomes an overcharge detection voltage, and is controlled by the control unit 1010 in such a manner that a charge current does not flow through a current passage of the cell 1001. After the charge control switch 1022 comes in a closed state, only discharging can be achieved through the diode 1023. During charging, the charge control switch 1022 comes in a closed state when a large current flows, so that the charge control switch 1022 can be controlled by the control unit 1010 so as to block a charge current flowing through the current passage in the cell 1001. The discharge control switch 1024 comes in a closed state when the battery voltage becomes an over-discharge detection voltage, and is controlled by the control unit 1010 so that a discharge current cannot flow through the current passage in the cell 1001. After the discharge control switch 1024 comes in a closed state, only charging can be achieved through the diode 1025. During discharging, the discharge control switch 1024 comes in a closed state when a large current flows, and is controlled by the control unit 1010 so as to block a discharge current flowing through the current passage in the cell 1001.

The temperature detection element 1016 is composed of, for example, a thermistor and is arranged in the vicinity of the cell 1001. The temperature measurement unit 1015 can measure the temperature of the cell 1001 by means of the temperature detection element 1016, and transmits a measurement result to the control unit 1010. The voltage measurement unit 1012 measures the voltage of the cell 1001 and the voltage of each of the magnesium secondary batteries 1002 constituting the cell 1001, and A/D-converts a measurement result and then transmits the converted result to the control unit 1010. The current measurement unit 1013 measures a current by means of a current detecting resistor 1014, and transmits a measurement result to the control unit 1010.

The switch control unit 1020 can control the charge control switch 1022 and the discharge control switch 1024 in the switching unit 1021 on the basis of a voltage and a current transmitted from the voltage measurement unit 1012 and the current measurement unit 1013, respectively. The switch control unit 1020 can transmit a control signal to the switch unit 1021 so as to prevent the occurrence of over-charging, over-discharging or over-current charging-discharging when the voltage of any one of the magnesium secondary batteries 1002 becomes equal to or lower than an overcharge detection voltage or an over-discharge detection voltage or when a large current flows rapidly. Each of the charge control switch 1022 and the discharge control switch 1024 can be composed of a semiconductor switch such as a MOSFET. In this case, each of diodes 1023 and 1025 is composed of a MOSFET parasitic diode. In the case where a p-channel-type FET is used as the MOSFET, the switch control unit 1020 supplies a control signal DO and a control signal CO to a gate unit of the charge control switch 1022 and a gate unit of the discharge control switch 1024, respectively. Each of the charge control switch 1022 and the discharge control switch 1024 is allowed to be electrically conducted at a gate potential that is lower by a specified value than the source potential. That is, in the common charging and discharging operations, the control signal CO and the control signal DO are adjusted to low levels, and each of the charge control switch 1022 and the discharge control switch 1024 is made in an electrically conductive state. For example, during overcharging or over-discharging occurs, each of the control signal CO and the control signal DO is adjusted to a high level, and each of the charge control switch 1022 and the discharge control switch 1024 is made in a closed state.

The memory 1011 is composed of, for example, a EPROM (erasable programmable read only memory) which is a non-volatile memory. In the memory 1011, a numerical value calculated in the control unit 1010, a magnesium secondary battery internal resistance value at an initial state of each of the magnesium secondary batteries 1002 as measured in each stage of the production process, and the like are stored in advance, wherein these values can be rewritable appropriately. The memory 1011 can calculate, in conjunction with the control unit 1010, a remaining capacity or the like by storing the full charge capacity of the magnesium secondary battery 1002 in the memory 1011.

In the temperature measurement unit 1015, a temperature can be measured by means of a temperature detection element 1016, and can achieve a charge-discharge control upon the occurrence of abnormal heating or can make a correction in the calculation of a remaining capacity.

Figure 10A:
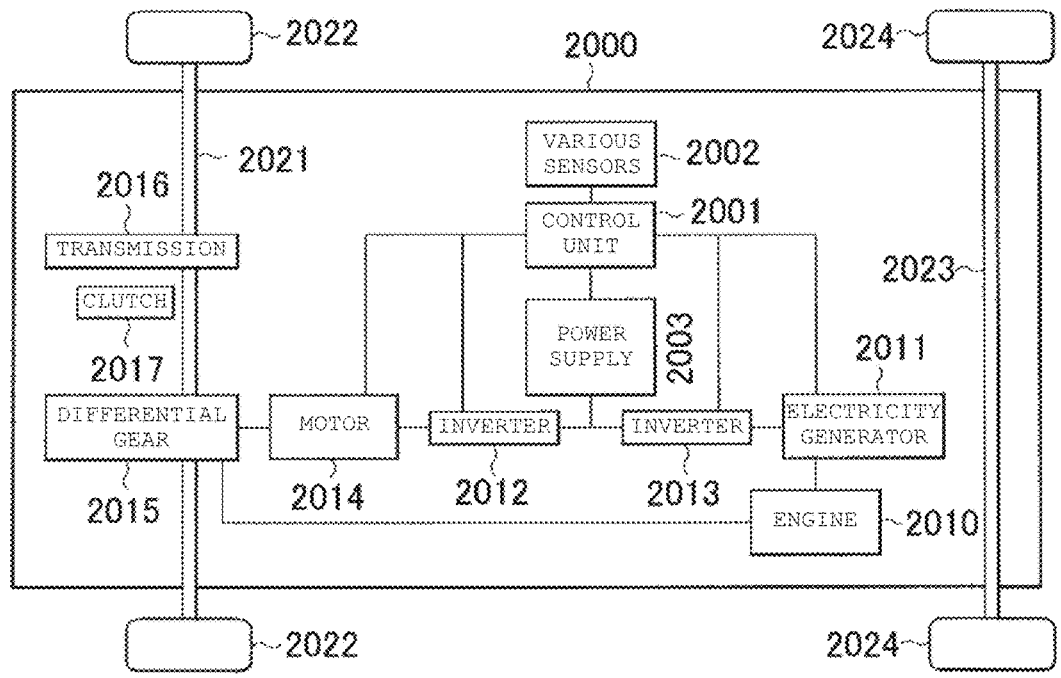
FIG. 10A, FIG. 10B and FIG. 10C are a block diagram illustrating the configuration of an application example (an electric vehicle) of the present disclosure in Example 5, block diagram showing the configuration of an application example (an electric power storage system) of the present disclosure in Example 5, and a block diagram showing the configuration of an application example (an electric power tool) of the present disclosure in Example 5, respectively according to an embodiment of the present technology.

Subsequently, the block diagram showing the configuration of an electric vehicle, e.g., a hybrid car, that is one embodiment of the electric vehicle is shown in FIG. 10A. The electric vehicle is provided with, for example, a control unit 2001, various sensors 2002, a power supply 2003, an engine 2010, an electricity generator 2011, inverters 2012 and 2013, a driving motor 2014, a differential gear 2015, a transmission 2016 and a clutch 2017 all housed in a metal-made housing 2000. In addition, the electric vehicle is also provided with, for example, front wheel drive shaft 2021, a front wheel 2022, a rear wheel drive shaft 2023 and a rear wheel 2024 all of which are connected to the differential gear 2015 and the transmission 2016.

The electric vehicle can run utilizing, for example, either one of the engine 2010 and the motor 2014 as a driving power source. The engine 2010 is a major driving power source and is, for example, a gasoline engine. In the case where the engine 2010 is used as a driving power source, the driving power (rotative force) of the engine 2010 is transmitted to a front wheel 2022 or a rear wheel 2024 through, for example, the differential gear 2015, the transmission 2016 and the clutch 2017 which are driving units. The rotative force of the engine 2010 is also transmitted to the electricity generator 2011, the electricity generator 2011 generates an alternate-current electric power by utilizing the rotative force, and the alternate-current electric power is converted to a direct-current electric power through the inverter 2013 and is stored in the power supply 2003. On the other hand, in the case where the motor 2014, which is a conversion unit (convertor), is used as a driving power source, an electric power (direct-current electric power) supped from the power supply 2003 is converted to an alternate-current electric power through the inverter 2012 and can drive the motor 2014 utilizing the alternate-current electric power. The driving force (rotative force) that is converted from the electric power by means of the motor 2014 is transmitted to the front wheel 2022 or the rear wheel 2024 through, for example, the differential gear 2015, the transmission 2016 and the clutch 2017 which are driving units.

When the electric vehicle is decelerated through a stabilizing mechanism that is not shown in the drawing, it is also possible that the resistance force generated during the deceleration is transmitted as a rotative force to the motor 2014 so that the motor 2014 can generate an alternate-current electric power utilizing the rotative force. The alternate-current electric power is converted to a direct-current electric power through the inverter 2012, and the direct-current regenerative electric power is stored in the power supply 2003.

The control unit 2001 (controller) can control the operation of the entire system of the electric vehicle, and is provided with, for example, a CPU or a processor. The power supply 2003 is provided with one or two or more magnesium secondary batteries (not shown) as described in Examples 1 to 4. The power supply 2003 may be configured so as to be connected to an external power supply and to receive the supply of an electric power from the external power supply to store the electric power therein. The various sensors 2002 can be used for controlling the number of rotations of the engine 2010 and also for controlling the opening angle of a throttle valve that is not shown in the drawing (i.e., throttle opening angle). The various sensors 2002 include, for example, a speed sensor, an acceleration rate sensor, an engine rotation number sensor and the like.

Hereinabove, a case where the electric vehicle is a hybrid car is described. However, the electric vehicle may be a vehicle that can be operated only using the power supply 2003 and the motor 2014 without using the engine 2010 (e.g., an electric vehicle).

Figure 10B:
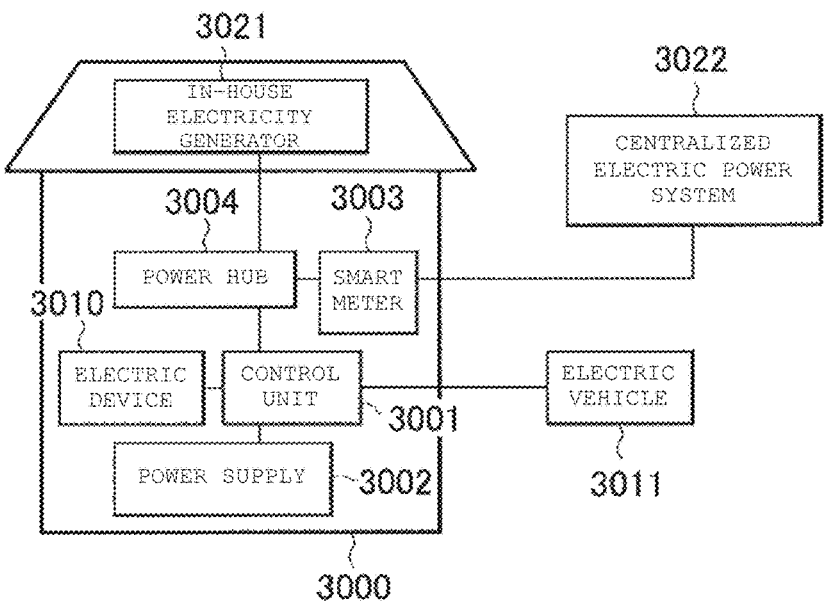

Next, the block diagram shown the configuration of an electric power storage system (an electric power supply system) is shown in FIG. 10B. The electric power storage system is provided with, for example, a control unit 3001, a power supply 3002, a smart meter 3003 and a power hub 3004 in a house 3000 such as a conventional house and a commercial building.

The power supply 3002 can be connected to, for example, an electric device (electronic device) 3010 placed in the house 3000, and can also be connected to an electric vehicle 3011 that is parked in the outside of the house 3000. The power supply 3002 can also be connected to, for example, an in-house electricity generator 3021 placed in the house 3000 through the power hub 3004, and can also be connected to an external centralized electric power system 3022 through the smart meter 3003 and the power hub 3004. The electric device (electronic device) 3010 includes, for example, one or two or more home electric appliances. Examples of the home electric appliance include a refrigerator, an air conditioner, a television receiver and a water heater. The in-house electricity generator 3021 is composed of, for example, a solar power electricity generator, a wind power electricity generator and the like. Examples of the electric vehicle 3011 include an electric automobile, a hybrid car, an electric motorbike, an electric bicycle and Segway (registered trademark). Examples of the centralized electric power system 3022 include a commercial power supply, a power-generating device, a power grid and a smart grid (a second-generation power grid), and also include a thermal power plant, a nuclear power plant, a hydroelectric power plant and a wind power plant. Examples of the power generation device to be provided in the centralized electric power system 3022 include, but are not limited to, various solar cells, fuel cells, wind power generating devices, micro hydroelectric power generating device and a geothermal power generating device.

The control unit 3001 (controller) can control the operation of the entire system of the electric power storage system (including the use condition of the power supply 3002), and is provided with, for example, a CPU or processor. The power supply 3002 is provided with one or two or more magnesium secondary batteries as mentioned in Examples 1 to 4 (not shown). The smart meter 3003 is, for example, a network-compatible electric power meter that is placed in the house 3000 that is an electric power demanding side, as can communicate with an electric power supply side. The smart meter 3003 controls the demand-supply balance in the house 3000 while, for example, communicating with the outside, and thereby enabling the efficient and stable supply or an energy.

In the electric power storage system, an electric power can be stored, for example, in the power supply 3002 from the centralized electric power system 3022, which is an external power supply, through the smart meter 3003 and the power hub 3004, and an electric power can also be stored in the power supply 3002 from the in-house electricity generator 3021, which is an independent power supply, through the power hub 3004. The electric power stored in the power supply 3002 is then supplied to the electric device (electronic device) 3010 and the electric vehicle 3011 in accordance with the instructions of the control unit 3001, and consequently can control the operation of the electric device (electronic device) 3010 and can charge the electric vehicle 3011. That is, the electric power storage system is a system which can store and supply an electric power in the house 3000 utilizing the power supply 3002.

The electric power stored in the power supply 3002 can be used arbitrarily. Therefore, it becomes possible to store an electric power from the centralized electric power system 3022 into the power supply 3002 in the midnight during which electricity prices are inexpensive and to use the electric power stored in the power supply 3002 in the daytime during which electricity prices are expensive.

The above-described electric power storage system may be placed in every house (family unit) or in every multiple houses (multiple family units).

Figure 10C:
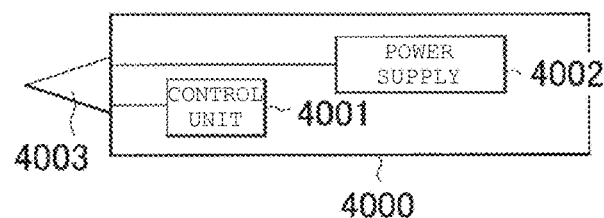

Next, the block diagram showing the configuration of an electric power tool is shown in FIG. 10C. The electric power tool is, for example, an electric power drill, and is provided with a tool main body 4000 made from a plastic material or the like and a control unit 4001 (controller) and a power supply 4002 both provided in the tool main body 4000. To the tool main body 4000, a drilling unit 4003 which is a movable member is attached rotatably. The control unit 4001 can control the operation of the entire system of the electric power tool (including the use condition of the power supply 4002), and is provided with, for example, a CPU or a processor. The power supply 4002 is provided with one or two or more magnesium secondary batteries as described in Examples 1 to 4 (not shown). The control unit 4001 can supply an electric power from the power supply 4002 to the drilling unit 4003 in accordance with the operation of a driving switch that is not shown in the drawing.

As mentioned above, the present disclosure is described with reference to the preferred examples. However, the present disclosure is not limited to these examples, and various modification can be made. The negative electrodes for magnesium secondary batteries, the methods for producing the negative electrodes, and the magnesium secondary batteries described in the examples are illustrative only, and may be modified appropriately. The electrode structure may be in a wound form or a stacked form. As the method for forming the underlying layer (including the 1$^{st}$ underlying layer) on the surface of the current collector, in addition to the method for pressure-bonding the underlying layers on the surface of the current collector described in the example, the following methods can also be employed: a method in which the underlying layers are formed on the surface of the current collector by an electroplating method; a method in which the underlying layers are formed on the surface of the current collector by a chemical plating method; a method in which the underlying layers are formed on the surface of the current collector by a combination of a chemical plating method and an electroplating method; and a method in which the underlying layers are formed on the surface of the current collector by an electrolytic deposition method.

The present disclosure is described below in further detail according to an embodiment

[A01] <A Method for Producing a Negative Electrode for Secondary Batteries: A First Aspect>

A method for producing a negative electrode for magnesium secondary batteries, including:

providing a current collector having, formed on the surface thereof, an underlying layer containing a metal having a higher ionization tendency than that of magnesium; and forming a negative electrode active material layer composed of a magnesium layer on the current collector by a chemical plating method using the underlying layer as a base material.

[A02] <A Method for Producing a Negative Electrode for Secondary Batteries: A Second Aspect>

A method for producing a negative electrode for magnesium secondary batteries, including the steps of:

providing a current collector having, formed on the surface thereof, a 1$^{st}$ underlying layer containing a metal having a higher ionization tendency than that of magnesium;

(A) forming a 1$^{st}$ magnesium layer on the current collector by a chemical plating method using the 1$^{st}$ underlying layer as a base material, and (B) subsequently repeating a process as mentioned below from n=1 to n=N−1 to form a negative electrode active material layer composed of the magnesium layers laminated on each other on the current collector, the process including:

forming a (n+1)$^{th}$ underlying layer containing a metal having a higher ionization tendency than that of magnesium on a n$^{th}$ (wherein n=1, 2, . . . , N−1; and N represents an integer of 2 or greater) magnesium layer; and forming a (n+1)$^{th}$ magnesium layer on the n$^{th}$ magnesium layer by a chemical plating method using the (n+1)$^{th}$ underlying layer as a base material.

[A03]

The method for producing a negative electrode for magnesium secondary batteries according to [02], wherein the (n+1)$^{th}$ underlying layer is formed by an electroplating method or an electrolytic deposition method.

[A04]

The method for producing a negative electrode for magnesium secondary batteries according to any one of [A01] to [A03], wherein the metal is at least one metal selected from the group consisting of potassium, calcium and sodium.

[A05]

The method for producing a negative electrode for magnesium secondary batteries according to any one of [A01] to [A03], wherein the metal is lithium.

[A06]

The method for producing a negative electrode for magnesium secondary batteries according to any one of [A01] to [A05], wherein the value of the BET specific surface area of the negative electrode active material layer is 1 m$^2$ or more, preferably 10 m$^2$ or more, per 1 g of the negative electrode active material layer.

[B01]

A method for producing a negative electrode for magnesium secondary batteries, including:

providing a current collector having, formed on the surface thereof, an underlying layer containing a metal having a higher ionization tendency than that of magnesium; and replacing the metal constituting the underlying layer by magnesium by a chemical plating method to cause the precipitation of magnesium, thereby forming a negative electrode active material layer composed of a magnesium layer on the current collector.

[B02] <A Method for Producing a Negative Electrode for Secondary Batteries: A Second Aspect>

A method for producing a negative electrode for magnesium secondary batteries, including:

providing a current collector having, formed on the surface thereof, a underlying, layer containing a metal having a higher ionization tendency than that of magnesium;

(A) replacing the metal constituting the $1^{st}$ underlying layer by magnesium by a chemical plating method to cause the precipitation of magnesium, thereby forming a $1^{st}$ magnesium layer on the current collector; and (B) subsequently repeating a process as mentioned below from n=1 to n=N-1 to form a negative electrode active material layer composed of magnesium layers laminated on each other on the current collector, the process including:

forming a $(n+1)^{th}$ underlying layer containing a metal having a higher ionization tendency than that of magnesium on a $n^{th}$ (wherein n=1, 2, . . . , N-1; and N represents an integer of 2 or greater) magnesium layer; and subsequently replacing the metal constituting the $(n+1)^{th}$ underlying layer by magnesium by a chemical plating method to cause the precipitation of magnesium, thereby forming a $(n+1)^{th}$ magnesium layer on $n^{th}$ magnesium layer.

[B03]

The method for producing a negative electrode for magnesium secondary batteries according to [B02], wherein the $(n+1)^{th}$ underlying layer formed by an electroplating method or an electrolytic deposition method.

[B04]

The method for producing a negative electrode for magnesium secondary batteries according to any one of [B01] to [B03], wherein the metal is lithium.

[B05]

The method for producing a negative electrode for magnesium secondary batteries according to any one of [B01] to [B04], wherein the value of the PET specific surface area of the negative electrode active material layer is 1 m² or more, preferably 10 m² or more, per 1 g of the negative electrode active material layer.

[C01] <A Negative Electrode for Secondary Batteries>

A negative electrode for magnesium secondary batteries, provided with a current collector and a negative electrode active material layer that is formed on the surface of the current collector and is made from magnesium, the value of the BET specific surface area of the negative electrode active material layer being 1 m² or more, preferably 10 m² or more, per the negative electrode active material layer.

[D01] <A Secondary Battery>

A magnesium secondary battery provided with a negative electrode for magnesium secondary batteries, the negative electrode for magnesium secondary batteries being provided with a current collector and a negative electrode active material layer that is formed on the surface of the current collector and made from magnesium, and the value of the BET specific surface area of the negative electrode active material layer being 1 m² or more, preferably 10 m² or more, per 1 g of the negative electrode active material layer.

[E01] <A Battery Pack>

A battery pack provider with a secondary battery, a control means for performing the control associated with the secondary battery, and an exterior housing in which the secondary battery is included, the secondary battery being composed of the magnesium secondary battery recited in [D01].

[E02] <An Electronic Device>

An electronic device that can receive the supply of an electric power from a secondary battery, the secondary battery being composed of the magnesium secondary battery recited in [D01].

[E03] <An Electric Vehicle>

An electric vehicle provided with a conversion device which can receive the supply an electric power from a secondary battery and can convert the electric power to a driving force for the vehicle and a control device which can perform an information processing associated with the control of the vehicle on the basis of information associated with the secondary battery, the secondary battery being composed of the magnesium secondary battery recited in [D01].

[E04] <An Electric Power System>

An electric power system which is so configured as to receive the supply or an electric power from a secondary battery and/or to supply an electric power from a power source to the secondary battery, the secondary battery being composed of the magnesium secondary battery recited in [D01].

[E05] <A Power Supply for Electric Power Storage Use>

A power supply for electric power storage use, which is provided with a secondary battery and is so configured that an electronic device to which an electric power is to be supplied can be connected thereto, the secondary battery being composed of the magnesium secondary battery recited in [D01].

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative electrode for magnesium secondary batteries, comprising:
    a current collector, and
    a negative electrode active material layer comprising a magnesium compound formed from a chemical plating method using at least one compound selected from the group consisting of
    $MgX_2$;
    $R_2$—Mg, wherein R is one of an alkyl group, a dialkylboron group, a diarylboron group, an alkylcarbonyl group, a trialkylsilyl group, or an alkylsulfonyl group; and
    R'—Mg—X, wherein R' is one of a linear or branched alkyl group having 1 to 10 carbon atoms, an aryl group, or an amino group, and X is a halogen atom,
    wherein the negative electrode active material layer is provided on a surface of the current collector, and
    wherein a value of a BET specific surface area of the negative electrode active material layer is 10 m² or more per 1 gram of the negative electrode active material layer.

2. A magnesium secondary battery including the negative electrode according to claim 1.

3. An electric vehicle comprising: the magnesium secondary battery according to claim 2; a converter configured to convert electric power supplied from the magnesium secondary battery to driving force; and a controller configured to control the electric vehicle based on information associated with the magnesium secondary battery.

4. A power storage system configured to receive supply of electric power from the magnesium secondary battery according to claim 2.

5. A power tool comprising: the magnesium secondary battery according to claim 2; and a movable member to which electric power is configured to be supplied from the magnesium secondary battery.

6. An electronic device comprising the magnesium secondary battery according to claim 2 as a power supply source.

7. The negative electrode according to claim 1, wherein $MgX_2$ is $MgCl_2$.

* * * * *